United States Patent
Horiuchi et al.

(10) Patent No.: US 6,812,996 B2
(45) Date of Patent: Nov. 2, 2004

(54) IMAGE PROCESSING APPARATUS, IMAGE PROCESSING METHOD AND PROGRAM

(75) Inventors: Makoto Horiuchi, Koganei (JP); Mamoru Umeki, Hachioji (JP); Akira Taguchi, Hachioji (JP); Youichi Ono, Akiruno (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 10/697,178

(22) Filed: Oct. 29, 2003

(65) Prior Publication Data

US 2004/0086273 A1 May 6, 2004

(30) Foreign Application Priority Data

| Nov. 6, 2002 | (JP) | 2002-322312 |
| Dec. 20, 2002 | (JP) | 2002-371077 |
| Dec. 20, 2002 | (JP) | 2002-371078 |

(51) Int. Cl.[7] .................. G03B 27/72; G03B 27/32; B41G 2/47
(52) U.S. Cl. ..................... 355/35; 355/27; 347/251
(58) Field of Search .................. 355/27, 32–35, 355/40–41; 347/251, 228; 396/564

(56) References Cited

U.S. PATENT DOCUMENTS 4,624,547 A * 11/1986 Endo et al. .................. 399/52
6,278,477 B1 * 8/2001 Ohba .......................... 347/251
6,624,876 B2 * 9/2003 Fukuda et al. ................ 355/29
2003/0043257 A1 * 3/2003 Umeki et al. ............... 347/251

FOREIGN PATENT DOCUMENTS

JP 62-249138 10/1987

* cited by examiner

Primary Examiner—Henry Hung Nguyen
(74) Attorney, Agent, or Firm—Frishauf, Holtz, Goodman & Chick, P.C.

(57) ABSTRACT

A density adjustment method for adjusting a density of a diagnostic image, having the steps of; exposing an image; developing the latent image; measuring a density of the developed image; creating a lookup table for relating the diagnostic image data and amount of exposure so as to form a density specified by the diagnostic image data; and correcting at least one of an exposure condition and a development condition to ensure that the next film has the optimized density, based on the difference between the measured density of a partial area of the film, and a density for comparison; wherein, a density of a prescribed area in a test exposure image is used as the density for comparison; while the exposure amount is used for exposing the partial area of the film at the time of forming a diagnostic image.

25 Claims, 22 Drawing Sheets

TRANSPORTATION DIRECTION

T2 = T1 - αTa

IMAGE PROCESSING APPARATUS, IMAGE PROCESSING METHOD AND PROGRAM

BACKGROUND OF THE INVENTION

The present invention relates to an image processing apparatus, an image processing method and a program, and particularly to an image processing apparatus, an image processing method and a program that provide appropriate density in a finished film when an image is formed thereon.

PRIOR ART

In the prior art laser imager (image processing apparatus) for medical treatment, a diagnostic image is represented in density gradation. This has created a strong demand for a basic function of outputting always stable density, and various measures have been taken to ensure stable density.

The laser imager for medical treatment has a so-called calibration function of controlling the image formation portion to ensure that the digital or video signal sent from each diagnostic apparatus or imaging apparatus has a constant density on a film.

Constant density is ensured immediately after calibration has been carried out, but density is subjected to changes for various reasons with the lapse of time after calibration. The heat development process is known to be easily changed.

For example;
(1) Change in exposure system due to temperature rise in an apparatus;
(2) Change in characteristics of heat development process such as temperature rise in heat development cooling/transfer section caused by successive film processing;
(3) Change in sensitivity characteristics of the film stored in an apparatus;
(4) Change in the heat development drum characteristics due to deposition of fatty acid caused by successive film processing;
(5) Use of film different in heat development characteristics.

Sometimes a so-called density patch method is used. In this method, the density of a finished film having been exposed and developed is measured in order to compensate for these changes. Then compensation is applied to the next print. One of the known techniques according to this density patch method is the laser recoding apparatus (image processing apparatus) where the density of the film having been heat developed is measured, and the result of measurement is fed back to the intensity of laser beam. (This is disclosed in the Official Gazette of Tokkai 249138/1987)

In this density patch method, a rectangular area of about 5×10 mm at a predetermined position of a film is exposed at a predetermined light intensity, and the developed density of this area is measured. Based on the difference from the density that should be obtained (hereinafter referred to as "density for comparison"), the exposure amount and/or heat development conditions are changed to ensure the optimum density for the subsequent prints.

Accordingly, if an incorrect value is used for this density for comparison, a compensation system will determine that image density is inappropriate even if a process system reproduces an appropriate image (density). This will result in excessive or insufficient density.

The exposure and heat development systems contain causes for variation for each apparatus, and it is not preferred to use a constant value for the density for comparison.

PROBLEM TO BE SOLVED BY THE INVENTION—1

The first problem of the present invention is how to provide a density adjustment method that can keep the image density of the same diagnostic image signals within the scope of almost the same density, even if fluctuation has occurred to the characteristics of the exposure and development systems or a difference has occurred to the film characteristics in formation of a diagnostic image.

PROBLEM TO BE SOLVED BY THE INVENTION—2

The present inventors have been led to the present invention by finding out that the problem is caused by the following reasons: (1) The patch portion for measuring the finished density for obtaining the difference from the density for comparison is formed at the tip of a film so that a whole image will not be adversely affected; (2) the posture of the film separated from a heating drum and moving toward a cooling/transfer section is not constant for each machine, and fluctuation is also caused by the change in the drum heating characteristics (development characteristics) resulting from the use of a drum (this phenomenon is conspicuous due to a soiled surface especially in the case of a drum with silicon layer provided on the surface); and (3) the sensitivity on the tip of the film and that on the other portion may be different in the case of films A and B of different types, as shown in FIG. 8.

Thus, the second problem of the present invention is how to provide an image processing apparatus, an image processing method and a program wherein, even if there is any fluctuation in an image processing apparatus or films of different types (film characteristics) are used, the density value for comparison is automatically corrected using the measured density value of the patch portion immediately after calibration, whereby the default value is automatically corrected and the finished film is adjusted to have an appropriate density.

PROBLEM TO BE SOLVED BY THE INVENTION—3

In the aforementioned compensation system, comparatively stable image density is obtained if power is turned on at all times. However, if power is turned off and the operation is resumed after that, an appropriate image has not been obtained in some cases. For example, assume that the system is used for medical diagnosis, and a medical diagnostic image has to be created when the medical treatment facility is closed. Also assume that creation of a diagnostic print is completed on Friday. Based on the final print on this date, the compensation amount for the next print is stored, and printing is carried out based on the compensation amount. Diagnostic printing must be restarted on Monday of the following week. In such cases, stable density has not been obtained so far, according to the prior art. To solve this problem, the apparatus has been kept turned on even on Saturday and Sunday when the office is closed. This prior art method, however, is not recommended from the viewpoint of energy saving.

When power cannot be kept turned on by all means for the reason of security management, the only way is to restart calibration. This has resulted in excessive film consumption, according to the prior art.

The present inventors have been led to the present invention by finding out that the aforementioned problem is caused by the fact that the characteristics of the process system such as an exposure system for formation of a latent image or a heat development system for visualization of a latent image are changed in response to the turning on/off of power.

The third problem of the present invention is how to provide an image processing apparatus, an image processing method and a program characterized in that, even if power is turned off freely, the image of appropriate density can be outputted, without the need of unwanted consumption of films through calibration at every turning on of power, whereby energy is saved and a film is processed to have an appropriate density without wasting a film.

Other problems of the present invention will be apparent from the following description:

SUMMARY OF THE INVENTION

To achieve the aforementioned objects, a density adjustment method according to the present invention comprises:

- an exposure step of forming an image by exposure of a film, based on the test exposure data or diagnostic image signal;
- a step of developing the aforementioned latent image exposed and formed;
- a step of measuring the density of the aforementioned developed image;
- a step of creating a lookup table for relating the image signal and amount of exposure so as to reproduce the density specified by the diagnostic image signal, based on the aforementioned test exposure data and the measured density of the image formed on the film by the test exposure data; and
- a step of correcting at least one of the exposure condition in the aforementioned exposure step and development condition in the aforementioned development step to ensure that the next film will have the optimized density, based on the difference between the measured density value obtained by exposing a partial area of the film in forming a diagnostic image by the aforementioned diagnostic image signal and by measuring the density of the partial area of the film, and the density value for comparison corresponding to the aforementioned predetermined amount of exposure.

This density adjustment method is further characterized in that the density of a predetermined area exposed based on the aforementioned test exposure data is measured, and this density value is used as the aforementioned density value for comparison; at the same time, expossure is carried out in the same amount of exposure as that of the predetermined area when the aforementioned partial area is exposed in formation of a diagnostic image.

According to this density adjustment method, a partial area is exposed in a predetermined amount of exposure, and the measured density value of the area exposed in a predetermined amount of exposure in calibration previously carried out—not a preset fixed value—is used as the density value for comparison when correcting at least one of the exposure condition and development condition. At the same time, a predetermined amount of exposure in the partial area is kept the same as that of the aforementioned predetermined area. Thus, even if fluctuation in characteristics has occurred to the exposure system and development system subsequent to calibration or even if a difference has occurred to film characteristics, more accurate compensation for image density can be achieved, and the image density of the same diagnostic image signal can be kept within the scope of almost the same density. Further, the measurement of the density for density value for comparison can be automatically performed simultaneously with the calibration. Accordingly, only one sheet of film is used, and this provides an economical advantage.

In the predetermined area conforming to the aforementioned density adjustment method, it is preferred to use the portion where the density is 1.0 through 2.0. In the image exposed according to the aforementioned test exposure data, the predetermined area at the tip of the film is preferred to be used for the measurement of density. It is also preferred that the partial area in the formation of the diagnostic image be provided at the tip of the film.

The other density adjustment method according to the present invention comprises:

- an exposure step of forming an image by exposure of a film, based on the test exposure data or diagnostic image signal;
- a step of developing the aforementioned latent image exposed and formed;
- a step of measuring the density of the aforementioned developed image;
- a step of creating a lookup table for relating the image signal and amount of exposure so as to reproduce the density specified by the diagnostic image signal, based on the aforementioned test exposure data and the measured density of the image formed on the film by the test exposure data; and
- a step of correcting at least one of the exposure condition in the aforementioned exposure step and development condition in the aforementioned development step to ensure that the next film will have the optimized density, based on the difference between the measured density value obtained by exposing the partial area of the film in forming a diagnostic image by the aforementioned diagnostic image signal and by measuring the density of the partial area of the film, and the density value for comparison corresponding to the aforementioned predetermined amount of exposure.

This density adjustment method is further characterized in that, after creation of the lookup table, the amount of exposure to get a predetermined density is obtained from the lookup table, and the film is exposed in that amount of exposure. Then the density of the image is measured, and the density is used as the density for comparison. At the same time, the partial area of the subsequent diagnostic images is exposed in the same amount of exposure as that amount.

According to this density adjustment method, a partial area is exposed in a predetermined amount of exposure, and the measured density value of the area exposed in a predetermined amount of exposure obtained from the lookup table created in calibration previously carried out—not a preset fixed value—is used as the density value for comparison when correcting at least one of the exposure condition and development condition. At the same time, a predetermined amount of exposure in the partial area is kept the same as that of the aforementioned predetermined area. Thus, even if fluctuation in characteristics has occurred to the exposure system and development system subsequent to calibration or even if a difference has occurred to film characteristics, more accurate compensation for image density can be achieved, and the image density of the same diagnostic image signal can be kept within the scope of almost the same density. Further, the amount of exposure can be obtained from the lookup table in such a way as to maintain the density area (e.g. D=1.0) sensitive to the fluctuation in characteristics after calibration. This improves the accuracy of compensation based on the difference between the measured density value of the partial area and density value for comparison. Further, both the amount of exposure in the partial area and that in the diagnostic image are determined via the lookup table, thereby simplifying the circuit configuration and data processing for determining the amount of exposure in a diagnostic image.

In the aforementioned density adjustment method, it is preferred to use the density of 1.0 through 2.0. In the image exposed according to the aforementioned test exposure data, the density in the predetermined area at the tip of the film is preferred to be used as the density value for comparison. In this case, it is preferred that density in the aforementioned predetermined area be measured several times and an average of these measurements be used as the density value for comparison.

Further, the other density adjustment method according to the present invention comprises:

an exposure step of forming an image by exposure of a film, based on the test exposure data or diagnostic image signal;

a step of developing the aforementioned latent image exposed and formed;

a step of measuring the density of the aforementioned developed image;

a step of creating a lookup table for relating the image signal and amount of exposure so as to reproduce the density specified by the diagnostic image signal, based on the aforementioned test exposure data and the measured density of the image formed on the film by the test exposure data; and a step of correcting at least one of the exposure condition in the aforementioned exposure step and development condition in the aforementioned development step to ensure that the next film will have the optimized density, based on the difference between the measured density value obtained by exposing the partial area of the film in forming a diagnostic image by the aforementioned diagnostic image signal and by measuring the density of the partial area of the film, and the density value for comparison corresponding to the aforementioned predetermined amount of exposure. This density adjustment method is further characterized in that, after creation of the lookup table, the amount of exposure to get a predetermined density is obtained from the lookup table, and the film is exposed in that amount of exposure. Then the density of the image is measured, and the density is used as the density for comparison. At the same time, the partial area of the subsequent diagnostic images is exposed in the same amount of exposure as that amount. This density adjustment method is still further characterized in that, when a change has been made to at least one of the aforementioned film, development step, exposure step and density measurement step, the aforementioned lookup table is created, and the aforementioned density value for comparison is set.

According to this density adjustment method, even if fluctuation in characteristics has occurred to the exposure system and development system subsequent to calibration or even if a difference has occurred to film characteristics, more accurate compensation for image density can be achieved, and the image density of the same diagnostic image signal can be kept within the scope of almost the same density.

When a status change has been made to at least one of the aforementioned film, development step, exposure step and density measurement step, a lookup table is re-created, even if there is a sudden change in the characteristics before or after that, and the aforementioned density value for comparison is set again. This feature eliminates the adverse effect caused by change in film status, and ensures more accurate compensation for the image density. The change in film status is defined as a change into the film of a different lot, and refers to the case where film development characteristics undergo sudden changes due to the lot.

For example, the aforementioned development process is carried out by a heating section containing the heating member for heating the film, and a cooling/transporting section for transferring the heated film while cooling it. When the heating member has been replaced and/or cooling/transporting section has been subjected to maintenance, the aforementioned lookup table is created and density value for comparison is set, thereby eliminating the adverse effect due to the fluctuation of the process conditions that have undergone sudden changes caused by replacement of the heating member or replacement of a non-woven fabric such as a guide member coming in contact with the film of the cooling/transporting section.

In the aforementioned density adjustment method, it is preferred to use the density of 1.0 through 2.0. The density in the predetermined area at the tip of the film is preferred to be used as the density value for comparison. In this case, it is preferred that density in the aforementioned predetermined area is measured several times and an average of these measurements be used as the density value for comparison.

Furthermore, the other density adjustment method according to the present invention comprises:

an exposure step of forming an image by exposure of a film, based on the test exposure data or diagnostic image signal;

a step of developing the aforementioned latent image exposed and formed;

a step of measuring the density of the aforementioned developed image;

a step of creating a lookup table for relating the image signal and amount of exposure so as to reproduce the density specified by the diagnostic image signal, based on the aforementioned test exposure data and the measured density of the image formed on the film by the test exposure data; and a step of compensating by correcting at least one of the exposure condition in the aforementioned exposure step and development condition in the aforementioned development step to ensure that the next film will have the optimized density, based on the difference between the measured density value obtained by exposing the partial area of the film in forming a diagnostic image by the aforementioned diagnostic image signal and by measuring the density of the partial area of the film, and the density value for comparison corresponding to the aforementioned predetermined amount of exposure. This density adjustment method is further characterized in that the density of the predetermined area exposed according to the aforementioned test exposure data is measured and the measurement is used as the density value for comparison. At the same time, exposure is carried out in the same amount of exposure as that of the predetermined area when the aforementioned partial area is exposed in formation of a diagnostic image.

When a status change has been made to at least one of the aforementioned film, development step, exposure step and density measurement step, a lookup table is re-created, and the aforementioned density value for comparison is set.

According to this density adjustment method, even if fluctuation in characteristics has occurred to the exposure system and development system subsequent to calibration or even if a difference has occurred to film characteristics, more accurate compensation for image density can be achieved, and the image density of the same diagnostic image signal can be kept within the scope of almost the same density. When a status change has been made to at least one of the aforementioned film, development step, exposure step and density measurement step, a lookup table is re-created, even if there is a sudden change in the characteristics before or after that, and the aforementioned density value for comparison is set again. This feature eliminates the adverse effect caused by change in film status, and ensures more accurate compensation for the image density. The change in film status is defined as a change into the film of a different lot, and refers to the case where film development characteristics undergo sudden changes due to the lot.

For example, the aforementioned development process is carried out by a heating section containing the heating member for heating the film, and a cooling/transporting section for transferring the heated film while cooling it. When the heating member has been replaced and/or cooling/transporting section has been subjected to maintenance, the aforementioned lookup table is created and density value for comparison is set, thereby eliminating the adverse effect due to the fluctuation of the process conditions that have undergone sudden changes caused by replacement of the heating member or replacement of a non-woven fabric such as a guide member coming in contact with the film of the cooling/transporting section.

In the predetermined area conforming to the aforementioned density adjustment method, it is preferred to use the portion where the density is 1.0 through 2.0. In the image exposed according to the aforementioned test exposure data, the predetermined area at the tip of the film is preferred to be used for the measurement of density. It is also preferred that the partial area in the formation of the diagnostic image be provided at the tip of the film.

The aforementioned second problem can be solved by the present invention characterized by the following features:

(21) An image processing apparatus comprising:

an exposure section for forming an image by exposure of a film, based on the test exposure data or diagnostic image signal;

a development section for developing and visualizing the exposed film;

a measuring section for measuring the density of the film having been exposed by the aforementioned exposure section and developed by the development section;

a calibration section for creating a lookup table for relating the image signal and amount of exposure so as to reproduce on the film the density specified by the diagnostic image data, based on the aforementioned test exposure data and the density of the image exposed and developed on the film according to the test exposure data, wherein the density of the image has been measured by the aforementioned measuring section;

a compensation section for correcting exposure condition in the aforementioned exposure section so that the density of the next film is optimized, based on the difference between the measured density value obtained by exposing the partial area of the film so as to reproduce predetermined density based on the same lookup table as that of diagnostic image in forming a diagnostic image by the aforementioned diagnostic image signal and by measuring the density of the partial area of the film, and the density value for comparison corresponding to the aforementioned predetermined amount of exposure. This image processing apparatus is further characterized by containing a correction section for correcting the density value for comparison based on the measured density value, prior to compensation by the compensation section subsequent to creation of the lookup table by the calibration section.

(22) The image processing apparatus of item (21) characterized in that the aforementioned correction section corrects the density value for comparison based on the measured density value, in the formation of an image within the predetermined time subsequent to creation of a lookup table by the calibration section.

(23) The image processing apparatus of item (21) or (22) characterized in that the density value for comparison is within the range of 1.0 to 2.0.

(24) An image processing method comprising:

an exposure step for forming an image by exposure of a film, based on the test exposure data or diagnostic image signal;

a development step for developing and visualizing the exposed film;

a measuring section for measuring the density of the film having been exposed by the aforementioned exposure section and developed by the development section;

a calibration step for creating a lookup table for relating the image signal and amount of exposure so as to reproduce on the film the density specified by the diagnostic image data, based on the aforementioned test exposure data and the density of the image exposed and developed on the film according to the test exposure data, wherein the density of the image has been measured by the aforementioned measuring section;

a compensation step for correcting exposure condition in the aforementioned exposure section so that the density of the next film is optimized, based on the difference between the measured density value obtained by exposing the partial area of the film so as to reproduce predetermined density based on the same lookup table as that of diagnostic image in forming a diagnostic image by the aforementioned diagnostic image signal and by measuring the density of the partial area of the film, and the density value for comparison corresponding to the aforementioned predetermined amount of exposure. This image processing method is further characterized by containing a correction step for correcting the density value for comparison based on the measured density value, prior to compensation by the compensation section subsequent to creation of the lookup table by the calculated step.

(25) The image processing method of item (24) characterized in that the aforementioned correction step corrects the density value for comparison based on the measured density value, in the formation of an image within the predetermined time subsequent to creation of a lookup table by the calibration section.

(26) The image processing method of item (24) or (25) characterized in that the density value for comparison is within the range of 1.0 to 2.0.

(27) A program for using a computer to implement the image processing method described in any of claim 4 through claim 6, characterized by being incorporated in an image processing apparatus.

The third problem of the present invention can be solved by the present invention characterized by the following features:

(31) An image processing apparatus comprising:

an exposure section for forming an image as a latent image on a film based on image data, and for exposing a partial area of the film for image formation with a predetermined exposure amount or with an output exposure amount computed via a LUT with respect to a specified density;

a development section for developing and visualizing the exposed film;

a measuring section for measuring the density of the partial area of the developed film;

a density control section for controlling the aforementioned exposure section and/or development section so that the density of the next film to be printed will be optimized, based on the difference between the predetermined density value for comparison and the measured density value, according to the result of measuring the density by the aforementioned measuring section;

a time monitoring section for monitoring the time when the power supply to the image processing apparatus is suspended; and a compensation section for correcting the control by the density control section, based on the down time monitored by the time monitoring section.

(32) An image processing apparatus comprising:

an exposure section for forming an image as a latent image on a film based on image data, and for exposing a partial area of the film for image formation with a predetermined exposure amount or with an output exposure amount computed via a LUT with respect to a specified density;

a development section for developing and visualizing the exposed film;

a measuring section for measuring the density of the partial area of the developed film;

a density control section for controlling the aforementioned exposure section and/or development section so that the density of the next film to be printed will be optimized, based on the difference between the predetermined density value for comparison and the measured density value, according to the result of measuring the density of a partial area of the film by the aforementioned measuring section;

a temperature detection section for detecting the temperature of at least one position on the image processing apparatus when power is turned on; and a compensation section for correcting the control by the density control section, based on the temperature detected by the temperature detection section.

(33) The image processing apparatus of item (32) characterized in that the development section is equipped with a heating/transporting section and a cooling/transporting section, and the cooling/transporting section is equipped with the aforementioned temperature detection section.

(34) The image processing apparatus of item (32) or (33) characterized in that the temperature detection section detects the temperature of the exposure section.

(35) An image processing apparatus comprising:

an exposure section for forming an image as a latent image on a film based on image data, and for exposing a partial area of the film for image formation with a predetermined exposure amount or with an output exposure amount computed via a LUT with respect to a specified density;

a development section for developing and visualizing the exposed film;

a measuring section for measuring the density of the partial area of the developed film;

a density control section for controlling the aforementioned exposure section and/or development section so that the density of the next film to be printed will be optimized, based on the difference between the predetermined density value for comparison and the measured density value, according to the result of measuring the density of a partial area of the film by the aforementioned measuring section;

a time monitoring section for monitoring the time when the power supply to the image processing apparatus is suspended;

a temperature detection section for detecting the temperature of at least one position on the image processing apparatus when power is turned on; and a compensation section for correcting the control by the density control section, based on the down time monitored by the time monitoring section and the temperature detected by the temperature detection section.

(36) The image processing apparatus of item (35) characterized in that the development section is equipped with a heating/transporting section and a cooling/transporting section, and the cooling/transporting section is equipped with the aforementioned temperature detection section.

(37) The image processing apparatus of item (35) or (36) characterized in that the temperature detection section detects the temperature of the exposure section.

(38) An image processing apparatus comprising:

an exposure section for forming an image as a latent image on a film based on image data;

a development section for developing and visualizing the exposed film;

a density control section for controlling the aforementioned exposure section and/or development section in such a way as to offset changes of characteristics in image formation, including those of the aforementioned exposure section and/or development section;

a time monitoring section for monitoring the time when the power supply to the image processing apparatus is suspended; and a compensation section for correcting the control by the density control section, based on the down time monitored by the time monitoring section.

(39) An image processing method comprising:

an exposure step for forming an image as a latent image on a film based on image data, and for exposing a partial area of the film for image formation with a predetermined exposure amount or with an output exposure amount computed via a LUT with respect to a specified density;

a development step for developing and visualizing the exposed film;

a measuring step for measuring the density of the developed film;

a density control step for controlling the aforementioned exposure step and/or development step so that the density of the next film to be printed will be optimized, based on the difference between the predetermined density value for comparison and the measured density value, based on the measurement of the density in a partial area of the film by the aforementioned measuring step;

a time monitoring step for monitoring the time when the power supply to the image processing apparatus is suspended; and a compensation step for correcting the control by the density control step, based on the down time monitored by the time monitoring step.

(40) An image processing method comprising:

an exposure step for forming an image as a latent image on a film based on image data, and for exposing a partial area of the film for image formation with a predetermined exposure amount or with an output exposure amount computed via a LUT with respect to a specified density;

a development step for developing and visualizing the exposed film;

a measuring step for measuring the density of the developed film;

a density control step for controlling the aforementioned exposure step and/or development step so that the density of the next film to be printed will be optimized, based on the difference between the predetermined density value for comparison and the measured density value, based on the measurement of the density in a partial area of the film by the aforementioned measuring step;

a temperature detection step for detecting the temperature of at least one position on the image processing apparatus when power is turned on; and a compensation step for correcting the control by the density control step, based on the temperature detected by the temperature detection step.

(41) The image processing method of item (40) characterized in that the development step is equipped with a heating/transporting section and a cooling/transporting section, and the cooling/transporting section is equipped with the aforementioned temperature detection step.

(42) An image processing method of item (39) or (40) characterized in that the temperature detection step detects the temperature of the exposure step.

(43) An image processing method comprising:

an exposure step for forming an image as a latent image on a film based on image data, and for exposing a partial area of the film for image formation with a predetermined exposure amount or with an output exposure amount computed via a LUT with respect to a specified density;

a development step for developing and visualizing the exposed film;

a measuring step for measuring the density of the developed film;

a density control step for controlling the aforementioned exposure step and/or development step so that the density of the next film to be printed will be optimized, based on the difference between the predetermined density value for comparison and the measured density value, based on the measurement of the density in a partial area of the film by the aforementioned measuring step;

a time monitoring step for monitoring the time when the power supply to the image processing apparatus is suspended;

a temperature detection step for detecting the temperature of at least one position on the image processing apparatus when power is turned on; and a compensation step for correcting the control by the density control step, based on the down time monitored by the time monitoring step and the temperature detected by the temperature detection step.

(44) The image processing method of item (43) characterized in that the development step is equipped with a heating/transporting section and a cooling/transporting section, and the cooling/transporting section is equipped with the aforementioned temperature detection step.

(45) The image processing apparatus of item (43) or (44) characterized in that the temperature detection step detects the temperature of the exposure step.

(46) An image processing method comprising:

an exposure step for forming an image as a latent image on a film based on image data, and for exposing a partial area of the film for image formation with a predetermined exposure amount or with an output exposure amount computed via a LUT with respect to a specified density;

a development step for developing and visualizing the exposed film;

a density control step for controlling the aforementioned exposure step and/or development step in such a way as to offset changes of characteristics in image formation, including those of the aforementioned exposure step and/or development step;

a time monitoring step for monitoring the time when the power supply to the image processing apparatus is suspended;

a compensation step for correcting the control by the density control step, based on the down time monitored by the time monitoring step.

(47) A program for using a computer to implement the image processing method described in any of claim 9 through claim 16, characterized by being incorporated in an image processing apparatus.

DETAILED DESCRIPTION OF THE PREFERRED EMBODIMENT

Figure 1:
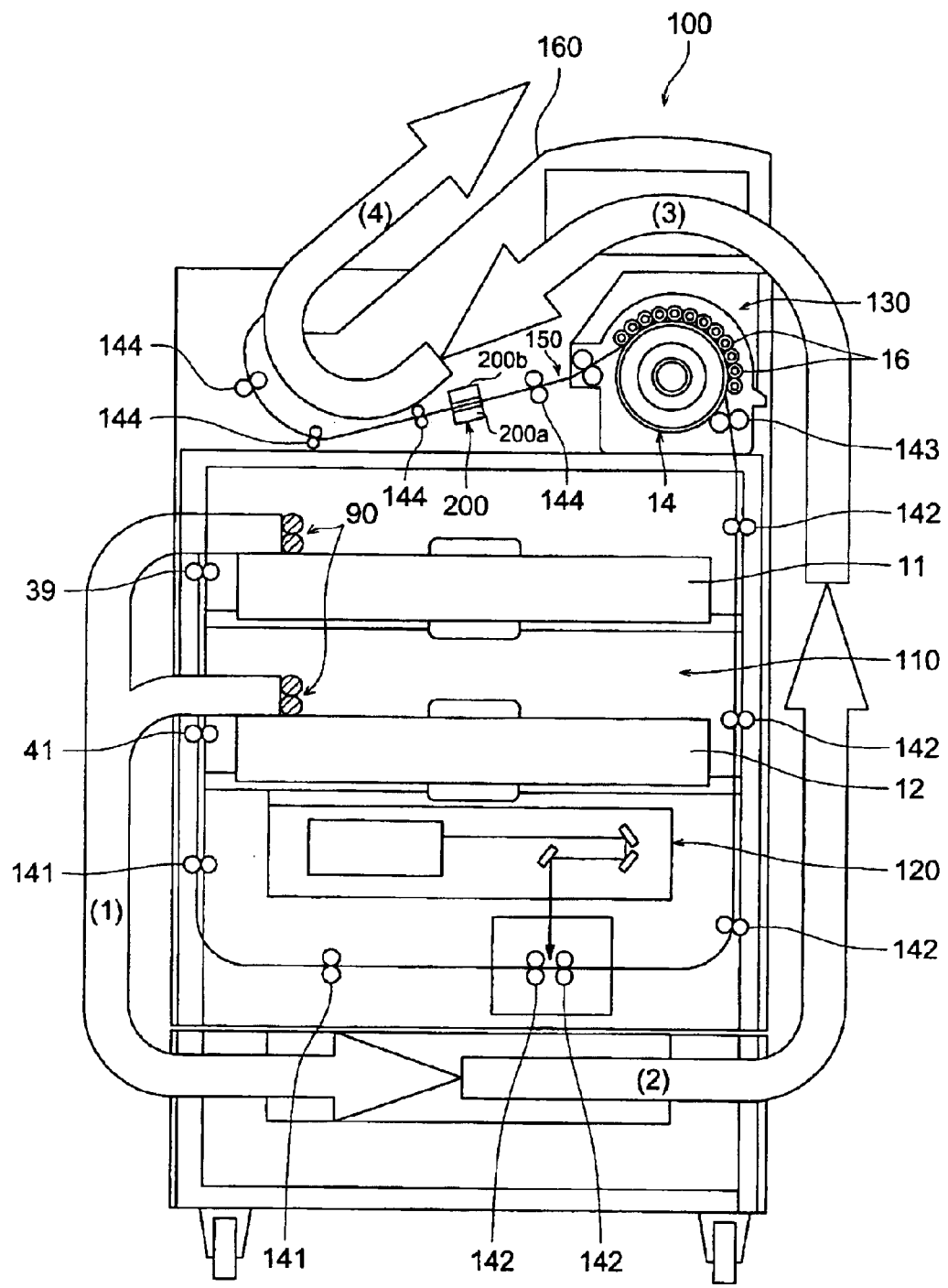
FIG. 1 is a front view representing the major sections of an image processing apparatus as an embodiment of the present invention.
Figure 2:
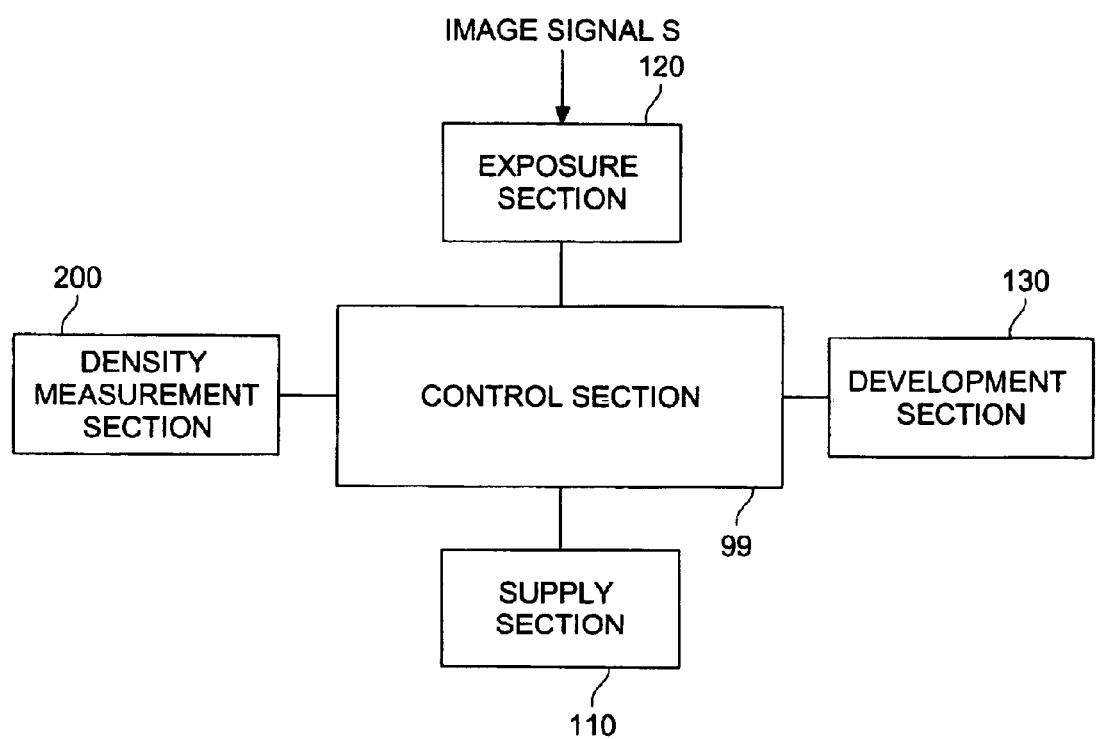
FIG. 2 is a block diagram representing the control system of an image processing apparatus.
Figure 3:
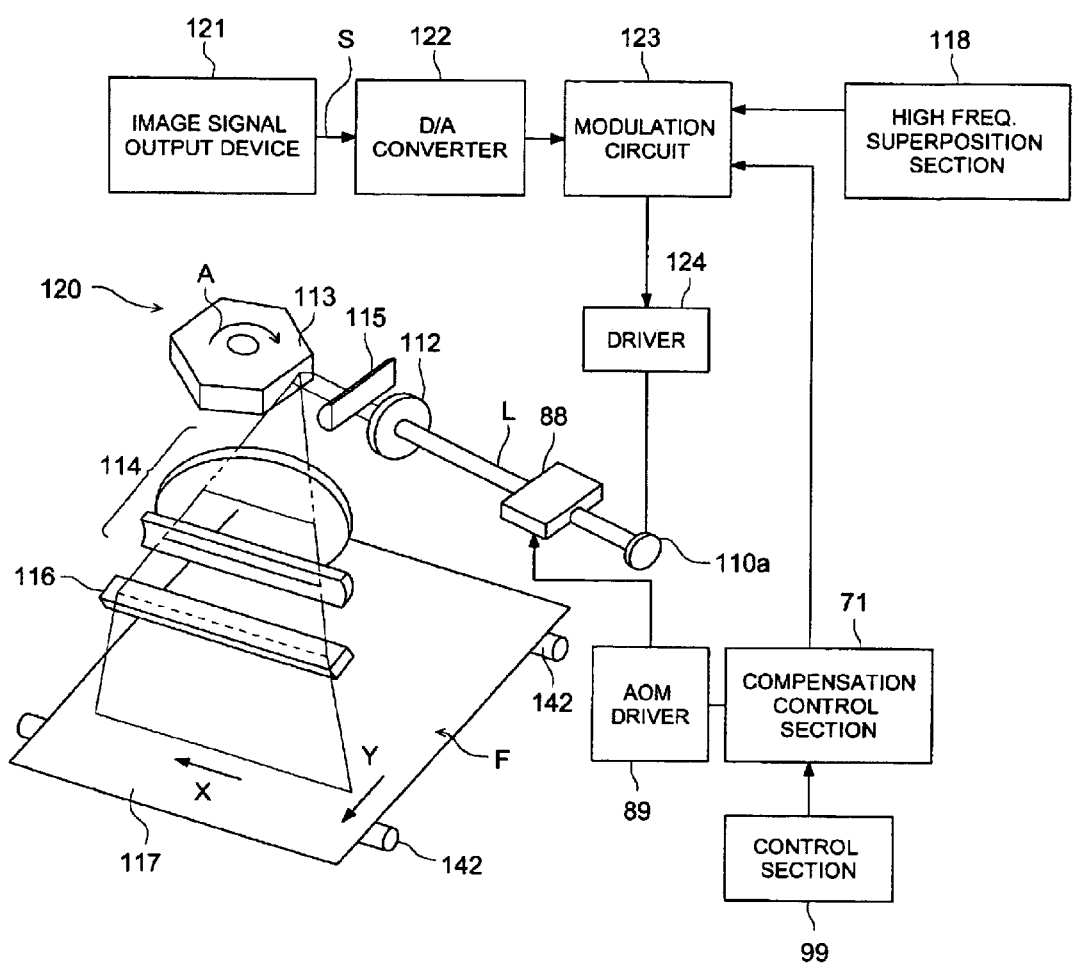
FIG. 3 is a diagram schematically showing the exposure section of the image processing apparatus given in FIG. 1.

The following describes the preferred embodiments of the present invention with reference to drawings:

FIG. 1 is a front view representing the major sections of an image processing apparatus as an embodiment of the present invention. FIG. 2 is a block diagram representing the control system of an image processing apparatus, and FIG. 3 is a diagram schematically showing the exposure section of the image processing apparatus given in FIG. 1.

(First Embodiment of the Present Invention)

As shown in FIG. 1, an image processing apparatus 100 comprises:
 a feed section 110 further including;
  a first loading section 11 and a second loading section 12 for loading a package containing a predetermined number of films as sheet-formed heat development photosensitive materials, and
  a supply section 90 for transferring and supply each film for exposure and development;
 an exposure section 120 for forming a latent image by exposing the film fed from the feed section 110;
 a development section 130 for heat development of the film with latent image formed thereon; and
 a densitometer 200 for getting information on density by measuring the density of the developed film. Films one by one are fed from the first and second loading sections 11 and 12 by the supply section 90 and transfer roller pairs 39, 40 and 141 in the arrow-marked direction (1) of FIG. 1.

As shown in FIG. 2, the image processing apparatus 100 is provided with a control section 99 for controlling the feed section 110, exposure section 120, development section 130 and densitometer 200. The control section 99 receives the control signal from the aforementioned various sections to control the entire system.

The following describes the exposure section 120 of the image processing apparatus 100 with reference to FIG. 3. As shown in FIG. 3, the exposure section 120 uses a rotary polygon mirror 113 to deflect the laser light L having a predetermined wavelength of 780 through 860 nm, thereby provide main scanning on the film F. At the same time, it causes the film F to make a relative movement in approximately the horizontal direction—a direction approximately at right angles with the direction of main scanning—with respect to laser light L, whereby sub-scanning is performed so that laser light L is used to allow a latent image to be formed on the film F.

The following describes a concrete configuration with reference to the exposure section 120: In FIG. 3, upon receipt of the image signal S as a digital signal outputted from the image signal output apparatus 121, the image signal S is converted into an analog signal by a digital-to-analog converter 122, and is inputted into a modulation circuit 123. Based on such an analog signal, the modulation circuit 123 controls the driver 124 of the laser light source 110a and applies the modulated laser light L from the laser light source 110a. Further, the high frequency component is superimposed on laser light through the modulation circuit 123 and driver 124 by a high frequency superposition section 118, thereby preventing the interference fringe of the film from being formed.

An acousto-optic modulator 88 is arranged between the lens 112 of the exposure section 120 and laser light source 110a. This acousto-optic modulator 88 is controlled and driven by an acousto-optic modulation (AOM) driver 89 based on the signal from the signal from the compensation control section 71 for adjusting the amount of modulation. The compensation control section 71 controls the acousto-optic modulator 88, based on the compensation signal from the control section 99, in such a way as to ensure the optimum amount of modulation (ratio of the amount of outgoing light with respect to the amount of incoming light) at the time of exposure.

The laser light L emitted from the laser light source 110a, wherein the amount of this light is adjusted to an optimum level by the acousto-optic modulator 88, passes through the lens 112, and is then converged in the vertical direction alone by a cylindrical lens 115. The light then enters the rotary polygon mirror 113 rotating in the direction marked with arrow "A" of FIG. 3 as linear image perpendicular to the drive shaft of this rotary polygon mirror. The rotary polygon mirror 113 reflects and deflects the laser light L in the direction of main scanning. After passing through the fθ lens 114 including a cylindrical lens composed of a combination of four lens, the deflected laser light L is reflected by the mirror 116 arranged in the direction of main scanning as an extension on the optical path, and main scanning is repeated in the direction of arrow "X" on the scanned surface 117 of the film F being transferred in the direction of arrow "Y" (being sub-scanned) by the transfer apparatus 142. This causes the laser light L to scan the entire surface of the scanned surface 117 of the film F.

The cylindrical lens of the fθ lens 114 is arranged to converge the incoming laser light L on the scanned surface only in the direction of sub-scanning. The distance from the fθ lens 114 to the scanned surface of the film F is equal to the focal distance of the entire fθ lens 114. As can been seen, the cylindrical lens 115 and fθ lens 114 including the cylindrical lens are arranged in the exposure section 120, and laser light L is converged in the direction of sub-scanning on the rotary polygon mirror 113. Thus, even if planar inclination or shaft vibration has occurred to the rotary polygon mirror 113, the scanning position of the laser light L does not deviate in the direction of sub-scanning on the scanned surface of the film F, thereby ensuring a scanning line of regular pitch to be formed. The rotary polygon mirror 113 is more advantageous in scanning stability than the galvanometer mirror and other optical deflectors, for example. In the manner described above, a latent image in conformity to image signal S is formed on the film F.

The following describes the development section 130 and cooling/transporting section 150 of the image processing apparatus given in FIG. 1: As shown in FIG. 1, the development section 130 contains a drum 14 capable of heating the film F while retaining it on the outer periphery, and a multiple rolls 16 for retaining the film by gripping it with the drum 14. The drum 14 incorporates a heater (not illustrated) and provides heat development of the film F by keeping the film F at a temperature above not less than a predetermined minimum heat development temperature (for example, about 110° C.) for a predetermined time for heat development. This allows the aforementioned development section 120 to form a visible image from the latent image formed on the film F. The heater of the drum 14 is controlled by the control section 99, and density is adjusted by changing the heater temperature, hence, development temperature.

A transfer roller pair 144 and densitometer 200 are incorporated on the left of the development section 130. Further, a cooling/transporting section 150 for cooling the heated film is provided. The film F removed from the drum 14 is cooled by the cooling/transporting section 150 while being fed to the position off to the lower right, as shown in the arrow (3) in FIG. 1. The densitometer 200 measures the density of the film F while the transfer roller pair 144 carries the cooled film F. Then the multiple transfer roller pairs 144 further feed the film F, as indicated by the arrow (4) in FIG. 1. The film is ejected into the ejection tray 160 so that the film can be taken out of the top of the image processing apparatus 100.

Figure 10:
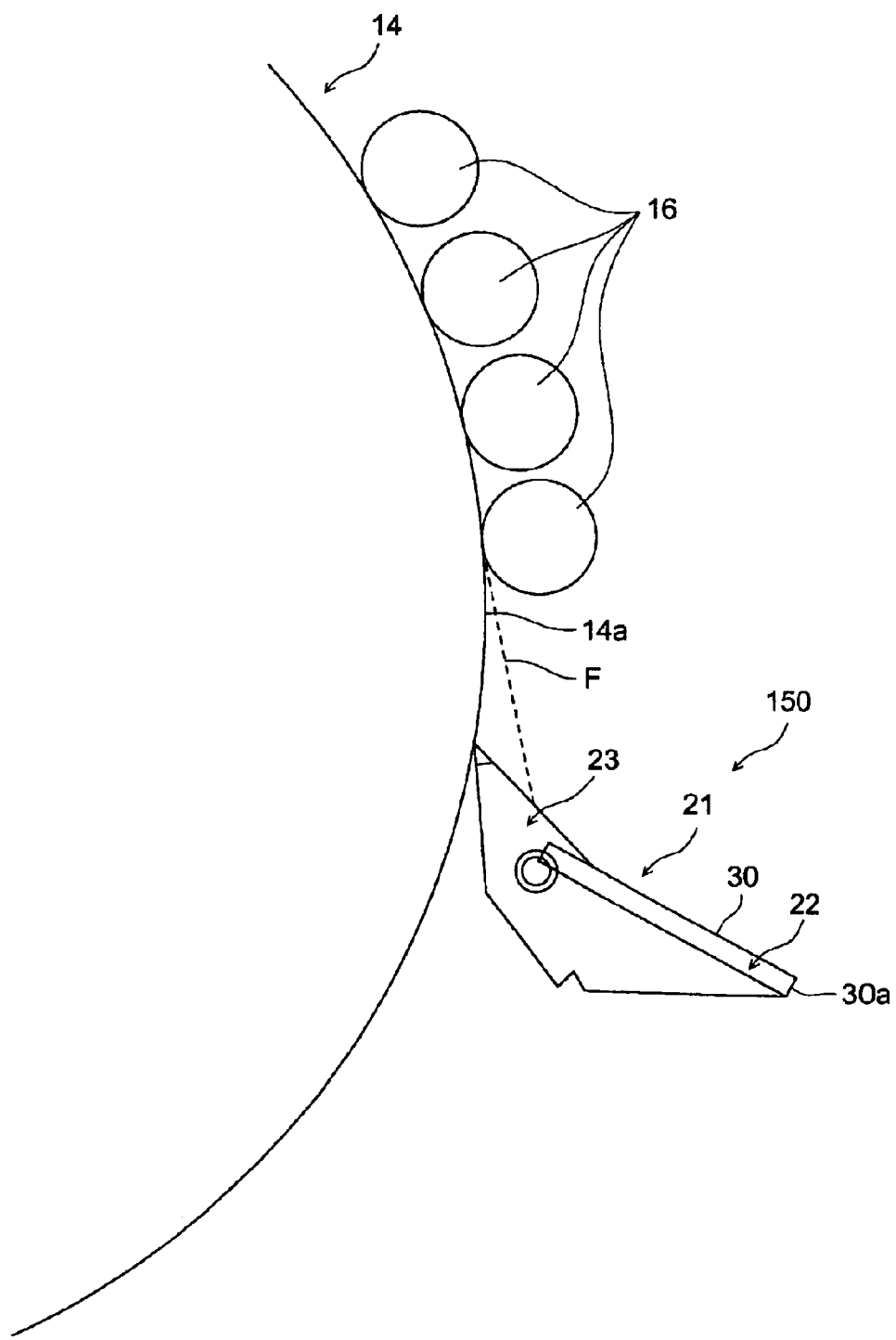
FIG. 10 is a front view of the major sections showing the guide member arranged close to the heating drum in the cooling/transporting section given in FIG. 1.

FIG. 10 is a front view of the major sections showing the guide member 21 arranged close to the heating drum 14 in the cooling/transporting section 150 given in FIG. 1. As shown in FIG. 10, the guide member 21 comprises a heat-insulated first member 22 of a non-woven fabric constituting a guide surface 30 for guiding the film F, and a thermally conductive second member 23 of aluminum or other metallic material arranged integrally with the bottom surface of the first member 22. In the guide member 21, after the film indicated by a broken line in FIG. 10 is transferred sandwiched between the heating drum 14 and guide roller 16, and is removed from the outer peripheral surface 14a, the film F is guided by the guide surface 30.

The densitometer 200 of FIG. 1 is provided with a light emitting section 200a and a light receiving section 200b. When the developed film is transferred between the light emitting section 200a and light receiving section 200b, as described above, the light emitted from the light emitting section 200a is received by the light receiving section 200b through the film, and density is measured according to the degree of attenuation of the received light.

In the present embodiment, the development section 130, together with the exposure section 120, is incorporated in the image processing apparatus 100, but it can be independent of the exposure section 120. In this case, it is preferred that there is a transfer section that feeds the film F from the exposure section 120 to the development section 130. It is also preferred that the drum 14 is covered with a heat insulating material to ensure easier temperature control of the drum 14.

Figure 9A:
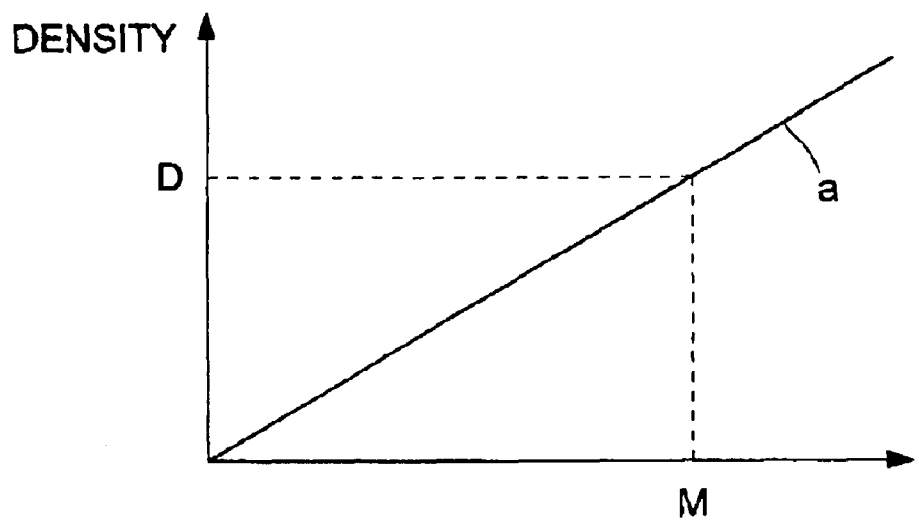
FIG. 9(a) is a diagram representing the relationship between the amount of light and density obtained in a calibration step as an embodiment of the present invention.
Figure 9B:
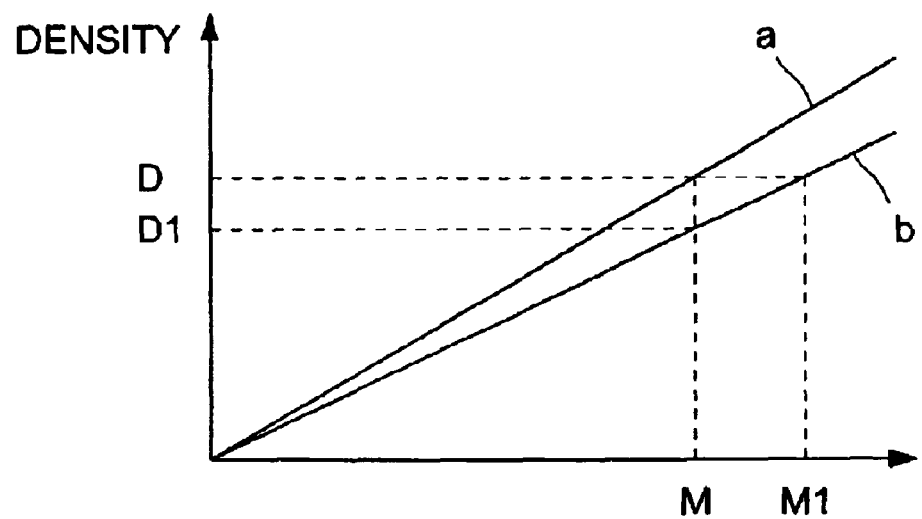
FIG. 9(b) is a diagram representing the relationship between the amount of light and density obtained again by repeating the calibration step.

The following describes calibration in the present embodiment with reference to FIG. 9: FIG. 9(a) is a diagram representing the relationship between the amount of light when the film is exposed, and density measured after development. FIG. 9(b) is a diagram representing the relationship between the amount of light and density obtained again by repeating the calibration step.

In the exposure section 120 of FIG. 3, the amount of exposure is calculated using the lookup table (LUT) as a conversion table between the density and amount of light inherent to the image processing apparatus at a certain point of time, in response to the image signal inputted into the exposure section 120 (signal for specifying the finished density from an image signal output apparatus 121 of a diagnostic apparatus, etc.). For this purpose, the latent image of a so-called wedge pattern, where the amount of light is gradually changed on a tentative basis by a predetermined exposure pattern signal inputted into the exposure section 120, is formed on a film. The density of the developed wedge pattern are measured, thereby creating a curve "a" representing the relationship between the amount of light and density as shown in FIG. 9(a). The step of creating the lookup table (LUT) in this way is called calibration.

In the subsequent steps of image formation, the amount of light M is calculated from the aforementioned lookup table, based on the density D specified by the image signal (=finished density specification), as shown in FIG. 9(a). This calculated amount of light is used to expose the film, whereby the density of the finished film can be adjusted to the specified level. As can been seen, the image signal is correlated to the amount of exposure in the lookup table so as to reproduce the density specified by the diagnostic image signal.

If eclipse has occurred to part of the optical path because of the change in alignment of the optical system in the exposure section 120 due to impact or the like on the image processing apparatus proper, there will be a change in the amount of light reaching the film even if control is made to get the amount of light given in FIG. 9(a), with the result that images with different densities will be formed in the phase of forming a latent image. If the development conditions and film characteristics are constant, the density of the finished film will become different. Accordingly, to maintain the density of the finished film constant, it is necessary to change the LUT that represents the relationship between the density and the amount of light. This makes it necessary to develop the latent image formed by the same exposure pattern signal and to measure the density of that pattern, thereby creating a curve "b" representing the relationship between the amount of light and density as shown in FIG. 9(b) and re-creating the LUT.

As shown in FIG. 9(b), the amount of light M1 is calculated based on the density D specified by the image signal (=finished density signal) by the LUT after recreation, and the film is exposed with this calculated amount of light, whereby the density of the finished film can be adjusted to the specified level. As can be seen, the amount of light newly obtained from the re-created LUT becomes the amount of light to be newly controlled. It should be noted that exposure is performed in the amount of exposure M if the curve "a" is used unchanged when the relationship between the density and amount of exposure due to the change in alignment of the optical system in the exposure section 120, for example, is changed as shown in curve "b". As can be seen from FIG. 9(b), the density of the finished film will be D1 that is lower than D.

Normally, there is a greater amount of variation in film characteristics among production lots, and a LUT is created every time a new film package is loaded. Further, as the operation time of the heating drum 14 is longer, heat development characteristics undergo changes due to deterioration of the heat transfer performance. In this case, the finished density becomes different. If such changes are anticipated, the LUT must be re-created, as in the aforementioned case.

To put it more specifically, in the aforementioned calibration step, test exposure data signal is inputted as the image signal S of FIG. 3, and the film is exposed by the exposure section 120 according to a predetermined exposure pattern where the amount of exposure is changed for each area and development is performed by the development section 130, whereby the density in each area of the exposure pattern formed on the film is measured by the densitometer 200. The relationship between the measured density and the amount of exposure is obtained as shown in FIG. 9(a), thereby creating the LUT representing the relationship between the specified density and amount of exposure. This LUT is stored in the memory of the compensation control section 71 of the exposure section 120. In this way, calibration is performed.

When image signal S has been inputted from the image signal output apparatus 121 into the exposure section 120 of FIG. 3, the laser light L modulated by the laser light source 110a is applied, whereby the film F is exposed to laser light, and a latent image is formed. In this case, the compensation control section 71 obtains the amount of exposure in response to the specified density in the image signal, from the aforementioned LUT. The compensation signal is fed back to the acousto-optic modulator 88 through the acousto-optic modulation (AOM) driver 89 in such a way that this amount of exposure is reached. The amount of modulation is controlled by the acousto-optic modulator 88, whereby the density of the finished film can be adjusted to the specified level.

The exposure pattern as the test exposure data includes an image to be exposed in a predetermined amount of light in multiple stages of about 5 through 100 (e.g. 20 stages) by changing the position sequentially in the direction of feed, and an image exposed in a predetermined amount of exposure in multiple stages of about 5 through 100 (e.g. 20 stages) by changing the position sequentially in a matrix form. It is also possible to use a test image of other pattern.

As described above, calibration is carried out when a new film package is loaded on the loading sections 11 and 12. Thus, even if there is a big variation in the film characteristics for each film package due to the production lot, a LUT conforming to a particular film is created. This method allows exposure to be carried out with compensation made for variations in the film characteristics.

Further, this method allows exposure to be carried out with compensation made for variations because calibration is carried out at a proper timing to produce a LUT, even if there is a change in the film sensitivity due to variations of temperature in the apparatus, the amount of laser light L is changed by the acousto-optic modulation (AOM) driver 89 and high frequency superposition section 118 being affected in the exposure section 120, there is a change in the alignment of the optical system in the exposure section 120, or there is a change in the characteristics of the heating drum 14.

Moreover, in the image forming apparatus 100 given in FIG. 1, an density image (patch image) for density management measuring about 5 by 10 mm is formed on the corner of the film tip under a certain condition in the exposure and development of a normal diagnostic image, thereby controlling the amount of modulation of the laser light and optimizing the density. To put it another way, a patch image is formed on the corner of the film tip when a diagnostic image is formed, and the density of the patch image is measured by the densitometer 200. The measured density of the patch image is compared with the density value for comparison. If the difference in density exceeds a certain value, the compensation control section 71 provides control in such a way that the optimum amount of modulation can be obtained at the time of the next film exposure.

In the density adjustment using the aforementioned patch image, the measured density value obtained in the previous calibration—not the preset fixed value—is used as the density value for comparison. In this manner, the variation of density, resulting from the aforementioned (1) through (5) exhibiting a relatively gentle with-time variation after the LUT has been created in the step of calibration, is fed back to the heat development condition and exposure condition (amount of exposure) in order to use the patch image-based compensation to offset this variation of density. This allows the finished density to be maintained with high accuracy. To put it another way;

even if development density is changed after creation of the LUT due to: changes in the film sensitivity due to the influence of changes of temperature in the apparatus; changes of characteristics in the acousto-optic modulation (AOM) driver 89 of the exposure section 120 and high frequency superposition section 118; and changes of characteristics in the heating drum 14; and even if a variation over a certain level has occurred, compensation based on the difference from the density value for comparison is carried out by the measurement of the patch image density. This method ensures appropriate finished density to be maintained.

Figure 6:
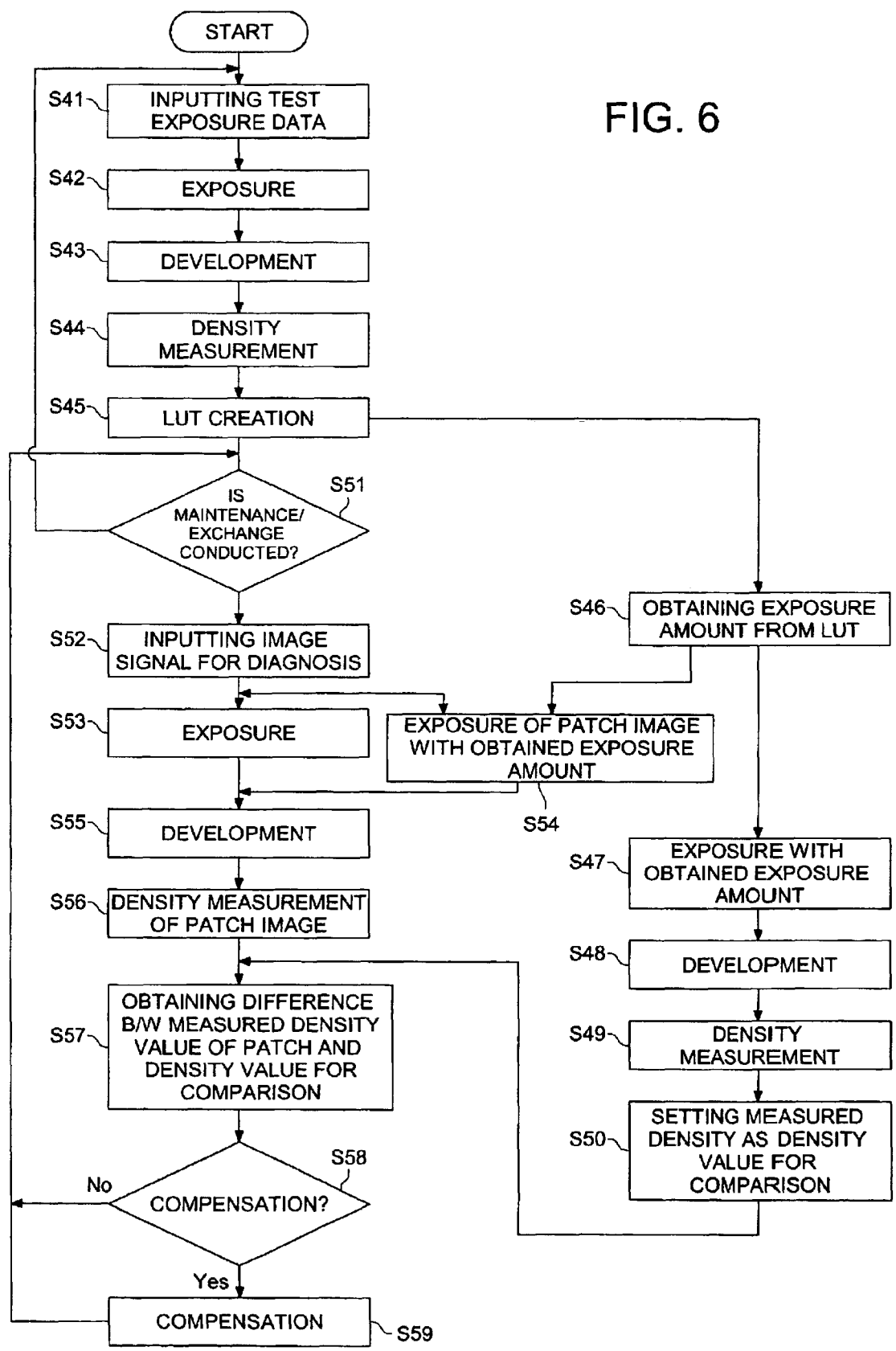
FIG. 6 is a flowchart representing still another step for density adjustment in the image processing apparatus given in FIG. 1.

In the case of FIG. 6 (to be described later), if a relatively sudden change of status in image processing is anticipated to take place, the LUT is re-created and the density value for comparison is also set again at the same time.

Figure 4:
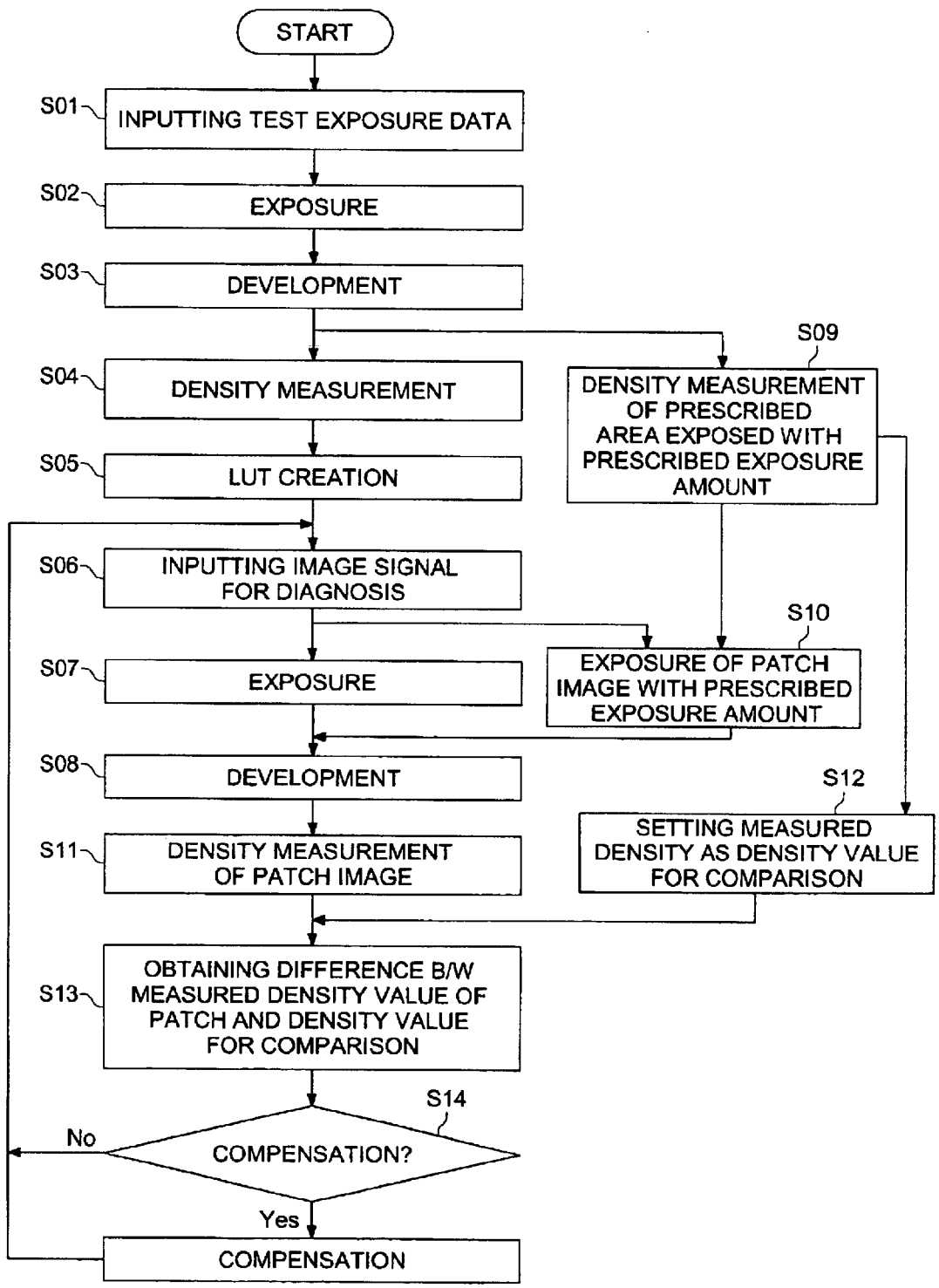
FIG. 4 is a flowchart representing a step for density adjustment in the image processing apparatus given in FIG. 1.

The following describes the operation of the image processing apparatus 100 using the FIG. 4 with reference to FIGS. 1 through 3:

(Calibration)

The test exposure data signal stored in the memory such as the control section 99 is inputted into the exposure section 120 (S01), and the film is fed in the directions (1) and (2) given in FIG. 1. Based on this input signal, film F is scanned by laser light in the exposure section 120, and exposure is performed according to a predetermined exposure pattern (S02). The film F on which the latent image of the test image has been formed based on the predetermined exposure pattern further fed in the direction (2) given in FIG. 1 by the roller pair 142. The film is further fed into the development section 130 by the roller pair 143. Passing through the drum 14 and multiple rollers 16, the film F is fed in the direction of (3) while being heated on the periphery of the drum 14 by the rotation of the drum 14. The film F is then heat-developed and the latent image of the test image is visualized (S03).

In the next step, the film F with the visualized test image formed thereon is fed by the transfer roller pair 144 and the density of the test image of the film F is read by the densitometer 200, thereby measuring the density (S04). Further, the film F is fed in the direction (4) by the transfer roller pair 144 and is ejected into the ejection tray 160 outside the apparatus 100. The density of the predetermined area exposed by the predetermined amount of exposure is measured in the aforementioned exposure step S02, and the measured density value is stored in the memory of the compensation control section 71 (S09). This density value is later used as a density value for comparison when comparison is made with the measured density value of the patch image. It should be noted that the predetermined area to be exposed in the predetermined amount of exposure is preferred to be the area on the film tip.

The LUT is created from the relationship between the density and amount of exposure obtained from the aforementioned measurement as shown in FIG. 9(a), and is stored in the memory of the compensation control section 71 of the exposure section 120 (S05). In the manner described above, calibration is carried out by the test exposure data.

(Formation of Diagnostic Image)

As shown in FIG. 3, a diagnostic image signal is inputted as image signal S from the image signal output apparatus 121 in the exposure section 120 (S06). The film F is subjected to laser exposure to form a latent image of the diagnostic image by applying the laser light L modulated from the laser light source 110a via the digital-to-analog converter 122, modulation circuit 123 and driver 124 (S07). In this step of exposure, density compensation is made by the aforementioned LUT.

In the aforementioned step of exposure, the patch image is exposed on the corner of the tip of the film F in the same amount of exposure as that for the predetermined area where density is measured in the aforementioned calibration step S09, whereby the latent image of the patch image is formed (S10).

As shown in FIG. 1, the film F is fed and heat-developed in the development section 130 to get the diagnostic image and patch image as visible images (S08). The film F with the patch image formed on the corner is further fed and the density of the patch image is measured by the densitometer 200(S11). Then the film F is ejected to the ejection tray 160 located at the outside of the image forming apparatus 100.

In the step of calibration (S09), the measured density value of the predetermined area exposed in the same amount of exposure as that of the patch image is used as a density value for comparison (S12) to get the difference between the measured density value of the patch image and the aforementioned density value for comparison (S13). Based on the difference in density, evaluation is made to determine whether or not compensation should be made (S14). If the difference in density is above a certain level, the compensation control section 71 allows the amount of compensation to be inputted into the memory in such a way that the optimum amount of modulation can be gained in the next film exposure (S15).

Out of the predetermined area exposed in the predetermined amount of exposure in the exposure step for calibration S02, the area whose density is from 1.0 through 2.0 is preferred to be used.

When the next diagnostic image data has been inputted (S06), the same step as the above is followed. In the exposure step (S07), laser exposure is provided by the laser light modulated with consideration given to the aforementioned amount of compensation. Namely;

even if development density is changed due to:
changes in the film sensitivity due to the influence of changes of temperature in the apparatus,
changes of characteristics in the acousto-optic modulation (AOM) driver 89 of the exposure section 120 and high frequency superposition section 118, and
changes of characteristics in the heating drum 14, and
even if a variation over a certain level has occurred, compensation for density is carried out in response to each situation, whereby a diagnostic image of appropriate density can be gained at all times.

As described above, according to the density adjustment method given in FIG. 4, the amount of exposure of the patch image is the same as that when measured density is obtained in the immediately preceding step of calibration. The automatic reading of the measured density value gained in the immediately preceding calibration step—not the predetermined fixed value—can be used as the density value for comparison to be compared with the measured density value. Even if the variation has occurred to the characteristics of the exposure and development systems of the exposure section 120 and development section 130, or difference has occurred to the film characteristics, more accurate compensation for the image density can be ensured every time such a trouble occurs, and the image density of the same diagnostic image signal can be kept within the scope of almost the same density. The density measurement for the density value for comparison S09 can be performed automatically at the same time as the density measurement S04 for calibration. Accordingly, only one film is used, and this provides an economical advantage.

Figure 5:
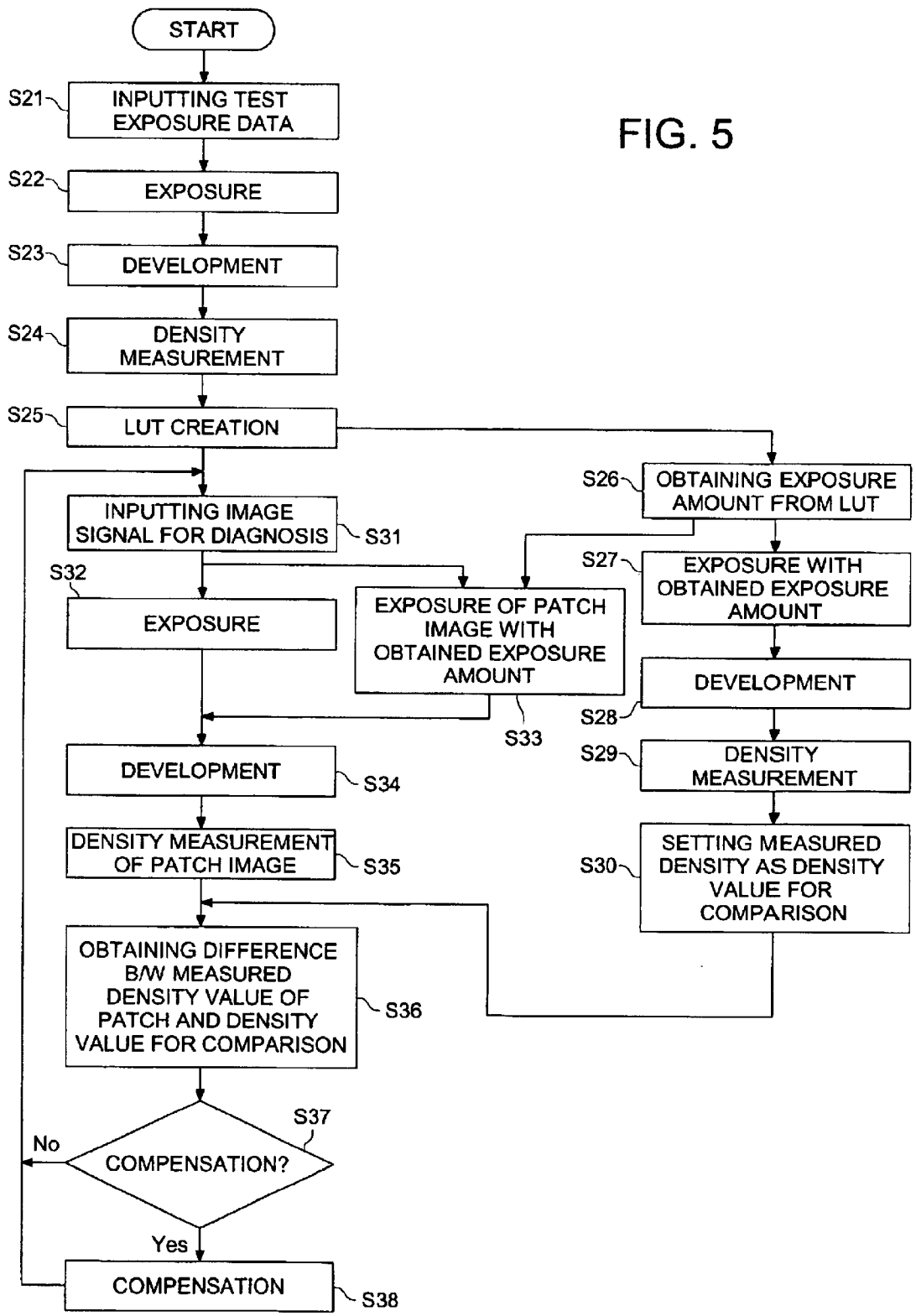
FIG. 5 is a flowchart representing another step for density adjustment in the image processing apparatus given in FIG. 1.

The following shows another density adjustment method with reference to the flowchart in FIG. 5: As shown in FIG. 4, calibration is performed as follows: To put it another way, the test exposure data signal is inputted into the exposure section 120 (S21). Based on this signal, the film F is exposed according to the predetermined exposure patch (S22). The film F with the latent image of the test image formed thereon is heat-developed in the development section 130 (S23). The density is measured (S24) when the densitometer 200 reads the density of the test image from the film F with the test image formed thereon. A LUT is created from the relationship between the density and amount of exposure obtained by this density measurement, and is stored in the memory of the compensation control section 71 of the exposure section 120 (S25).

Then the amount of exposure for getting a predetermined density is obtained from the aforementioned LUT (S26), and the film is exposed (S27) and developed (S28) in this obtained amount of exposure. The density of the image in the exposed area is measured and the measured density value is stored in the memory of the compensation control section 71 (S29). This measured density value is later used as the density value for comparison when comparison is made with the measured density value of the patch image (S30).

When the diagnostic image signal is inputted into the exposure section 120 (S31), the film F is subjected to laser exposure to form a latent image of the diagnostic image (S32), similarly to the case of FIG. 4. In this case, a patch image is formed on the corner of the film tip (S33) by exposure performed in the same amount of exposure as that obtained in the aforementioned step S26. The film is then heat-developed by the development section 130 (S34) and the density of the patch image formed on the corner of the film F is measured by the densitometer 200 (S35).

Based on the density difference obtained from the measured density value of the patch image and the density value for comparison obtained in the aforementioned step 30 (S36), evaluation is made to determine whether or not compensation should be made (S37). If the difference in density is above a certain level, the compensation control section 71 allows the amount of compensation to be inputted into the memory in such a way that the optimum amount of modulation can be gained in the next film exposure (S38).

Going back to the step 31, the same step as the aforementioned one is followed when the next diagnostic image signal has been inputted. In the exposure step S32, laser exposure is provided by the laser light modulated with consideration given to the aforementioned amount of compensation.

As described above, according to the density adjustment method given in FIG. 5, the value obtained by measuring the density of the image exposed in the amount of exposure got from the LUT created in the immediately preceding calibration step—not the predetermined fixed value—can be used as the density value for comparison to be compared with the measured density value of the patch image. Accordingly, similarly to the case of FIG. 4, even if the variation has occurred to the characteristics of the exposure and development systems of the exposure section 120 and development section 130, or difference has occurred to the film characteristics, more accurate compensation for the image density can be ensured every time such a trouble occurs, and the image density of the same diagnostic image signal can be kept within the scope of almost the same density.

In FIG. 4, the target density value is read by specifying the absolute amount of light. So if there is a change in the development characteristics, compensation will be repeated for the difference in the patch image density based on the finished area having the density of about D=0.5 where the sensitivity to the fluctuation in characteristics is relative weak, even if the amount of light is specified so that the density area inherently sensitive to the fluctuation in characteristics (e.g. D=1.0) is gained. Accuracy is slightly inferior in this method. By contrast, in FIG. 5 the amount of light is calculated according to the LUT to ensure that sensitive density area (e.g. D=1) subsequent to calibration will be maintained. This method improves the accuracy of compensation for the difference in temperature of the patch image. Further, the amount of exposure for the patch image and that for diagnostic image are both determined through the LUT, thereby simplifying the circuit configuration and data processing for determining the amount of light for diagnostic image.

In FIG. 4, the amount of exposure of the patch image without passing through the LUT coexists with that of diagnostic image passing through the LUT. This complicates the circuit configuration and data processing. While only one sheet of film is used in FIG. 4, at least two sheets of film (one for calibration and the other for measurement of the density value for comparison) are required in FIG. 5.

The following shows still another density adjustment method with reference to the flowchart given in FIG. 6. The density adjustment method in FIG. 6 is based on the same principle as that in FIG. 5. However, there will be a sudden change in the development characteristics when the drum 14 has been replaced or cooling/transporting section 150 has been subjected to maintenance including replacement and cleaning in the image forming apparatus 100. So a lookup table is re-created, and the aforementioned density value for comparison to be compared with the measured density value of the patch image is set again.

Calibration is performed in a manner similarly to the case of FIG. 5. To put it another way, the test exposure data signal is inputted into the exposure section 120 (S41), and the film is exposed according to a predetermined exposure pattern (S42). Then the film is heat-developed in the development section 130 (S43), and the density of the test image is read by the densitometer 200, thereby measuring the density (S44).

Based on the relationship between the density and amount of exposure obtained from this density measurement, a LUT is created and is stored into the memory of the compensation control section 71 of the exposure section 120 (S45).

From the aforementioned LUT, the amount of exposure is obtained to get a predetermined density (S46). The film is exposed (S47) and developed (S48) in this obtained amount of exposure. The density of the image in the exposed area is measured and the measured density value is stored in the memory of the compensation control section 71 (S49). This measured density value is later used as the density value for comparison when comparison is made with the measured density value of the patch image (S50).

If such maintenance as replacement of the heating drum 14 or cleaning of the cooling/transporting section 150 is not performed in the image forming apparatus 100 after the creation of the aforementioned LUT and setting of the density value for comparison (S51), the diagnostic image signal will be inputted into the exposure section 120 (S52) and the film F will be exposed (S53), similarly to the case of FIG. 5. In this case, the corner of the film tip is exposed in the same amount of exposure as that obtained in the step S46, thereby forming a patch image (S54). Heat development is carried out in the development section 130 (S55) and the density of the patch image formed on the corner of the film F is measured by the densitometer 200 (S56).

Evaluation is made to determine (S58) whether or not compensation should be made based on the density difference (S57) obtained from the measured density value of the patch image and density value for comparison obtained in the step S50. If the difference in temperature is above a certain level, the compensation control section 71 allows the amount of compensation to be inputted into the memory in such a way that the optimum amount of modulation can be gained in the next film exposure (S59).

The system goes back to the step S51. If such maintenance as replacement of the heating drum 14 or cleaning of the cooling/transporting section 150 is performed in the image forming apparatus 100 (S51), the system goes back to the step S41 to follow the steps 41 through 45, whereby density value for comparison is set again.

As described above, according to the density adjustment method given in FIG. 6, even if the variation has occurred to the characteristics of the exposure and development systems of the exposure section 120 or development section 130, or difference has occurred to the film characteristics, more accurate compensation for the image density can be ensured every time such a trouble occurs, and the image density of the same diagnostic image signal can be kept within the scope of almost the same density, similarly to the case of FIG. 5. Further, this method improves the accuracy of compensation for the difference in density of the patch image, thereby simplifying the circuit configuration and data processing for determining the amount of light for diagnostic image.

When the heating drum 14 has been replaced, the nonwoven fabric of the first member 22 constituting the guide surface 30 of the guide member 21 in the cooling/transporting section 150 has been replaced or the transfer roller pair 144 of the guide surface 30 has been cleaned at the time of maintenance of the image forming apparatus 100, these characteristics are subjected to relatively sudden changes. After that, the LUT is re-created and the density value for comparison to be compared with the measured density value of the patch image is set again. This procedure provides adequate compensation and offsets the changes in characteristics caused by such maintenance work.

The predetermined density in the steps S26 and S27 in FIGS. 5 and 6 is preferred to be in the range from 1.0 to 2.0.

It is preferred that the density value for measurement to get the density value for comparison be determined by carrying out measurement several times and taking an average of these measurements. This will provide more accurate value.

Further, the density adjustment method in FIG. 6 consists of the method given in FIG. 5, plus the step S51 of determining if the maintenance should be carried out or not. Similarly, the same effect as that in FIG. 6 can be obtained by adding to the method given in FIG. 4 the step S51 of determining if the maintenance should be carried out or not.

Figure 7:
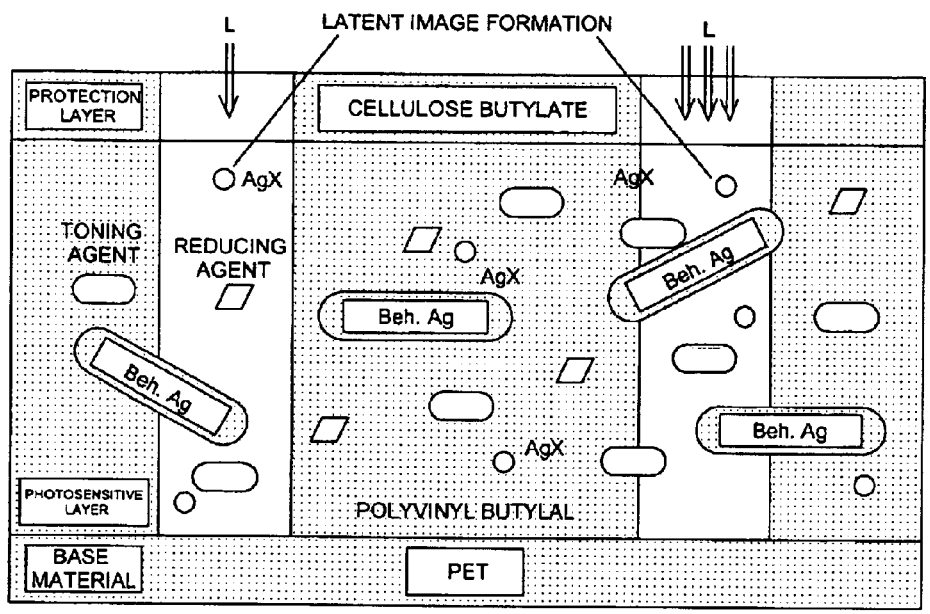
FIG. 7 is a cross sectional view of a film F schematically showing the chemical reaction in the film F during exposure in the image processing apparatus given in FIG. 1.
Figure 8:
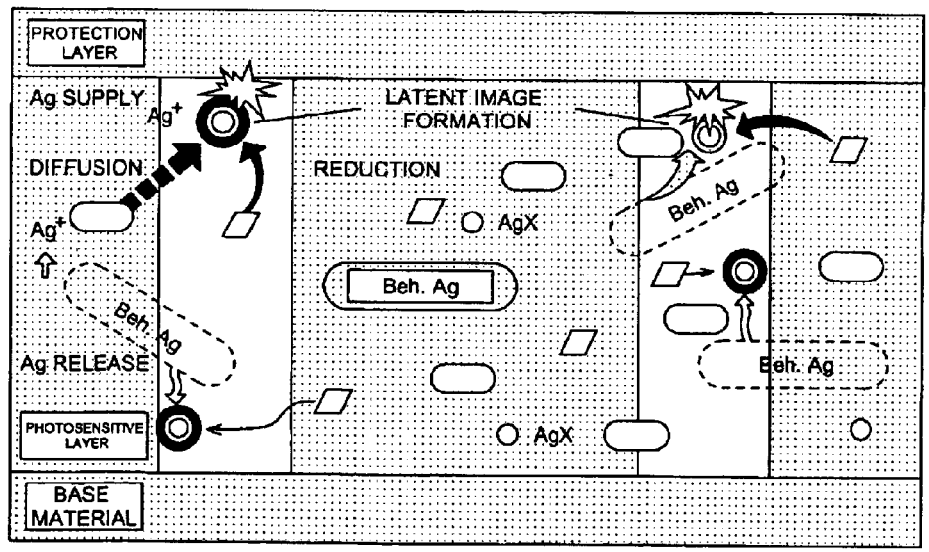
FIG. 8 is a cross sectional view, similar to FIG. 7, schematically showing the chemical reaction in the film F during heating in the image processing apparatus given in FIG. 1.

The following shows the latent image formation and heat development in the film M as a photosensitive material for heat development as the present embodiment, with reference to FIGS. 7 and 8: FIG. 7 is a cross sectional view of a film F schematically showing the chemical reaction in the film F during exposure. FIG. 8 is a cross sectional view, similar to FIG. 7, schematically showing the chemical reaction in the film F during heating.

The film F consists of a photosensitive layer mainly composed of heat resistant binder, formed on the base material (substrate) made of PET. Further, a protective layer mainly consisting of heat resistant binder is formed on this photosensitive layer. The photosensitive layer is mixed with halogenated silver particles, silver behenate (Beh. Ag) as a type of organic acid silver, reducing agent and toning agent. Further, a back layer mainly composed of heat resistant binder is provided on the back of the base material.

When the laser light L is applied from the exposure section 120 to the film F at the time of exposure, halogenated silver particles are applied to the area exposed to laser light L, as shown in FIG. 7, whereby a latent image is formed. In the meantime, the film F is heated by the drum 14 of the development section 130 as described above. When the temperature has exceeded the minimum temperature level for heat development, silver ion ($Ag^+$) is supplied from silver behenate as shown in FIG. 8. The behenic acid having supplied forms toning agent and complex. Then the silver ion diffuses, and a silver image is considered to be formed by chemical reaction through the action of reducing agent, with the exposed halogenated silver particle as a nucleus. As described above, the film F contains photosensitive halogenated silver particle, organic acid silver and silver ion reducing agent. It is not subjected to heat development at the temperature below 40° C. This film is subjected to heat development at the minimum development temperature above 80° C. (e.g. at about 110° C.).

The present invention has been discussed with reference to an embodiment. It should be noted, however, that the present invention is not restricted to this embodiment. It can be embodied in a great number of variations without departing from the technological spirit and scope of the invention claimed. For example, the intensity (amount) of laser light is adjusted to compensate for density in the present embodiment. It is possible to control the heater temperature of the drum 14 of the development section 130, thereby adjusting the development temperature. It is also possible to adjust both the intensity (amount) of laser light and development temperature.

(Second Embodiment of the Present Invention)

The following describes the functions characteristic of the second embodiment of the present invention in the image processing apparatus given in FIG. 1. These functions are realized when controlled by the software program (program) stored in advance in a predetermined storage apparatus such as flash ROM (not illustrated) in the image processing apparatus. The image processing apparatus of the present invention is provided with the microcomputer (computer) containing a CPU (not illustrated). The following functions are performed by running of the program by such a computer.

Figure 11:
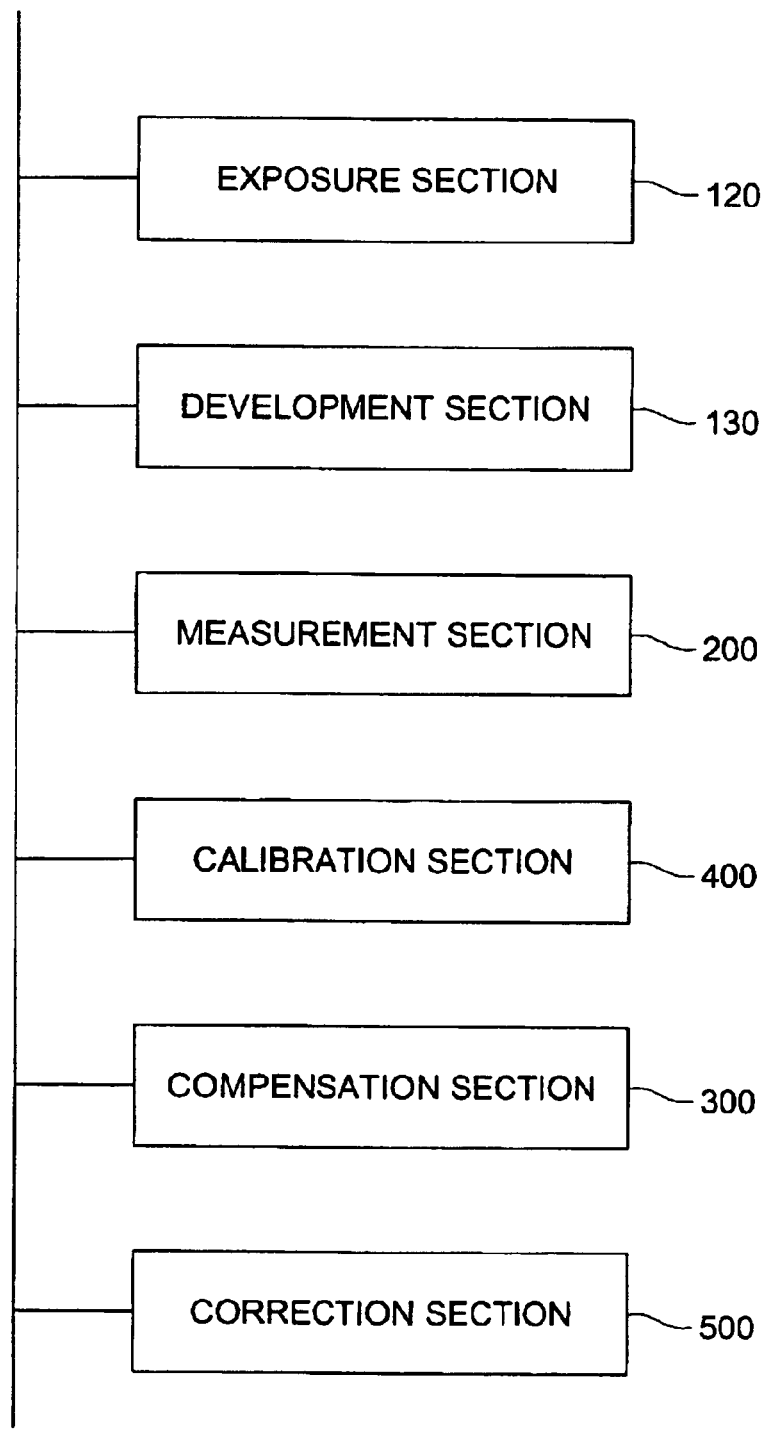
FIG. 11 is a block diagram representing the functions of an image processing apparatus for implementing the image processing method of the present invention.
Figure 12:
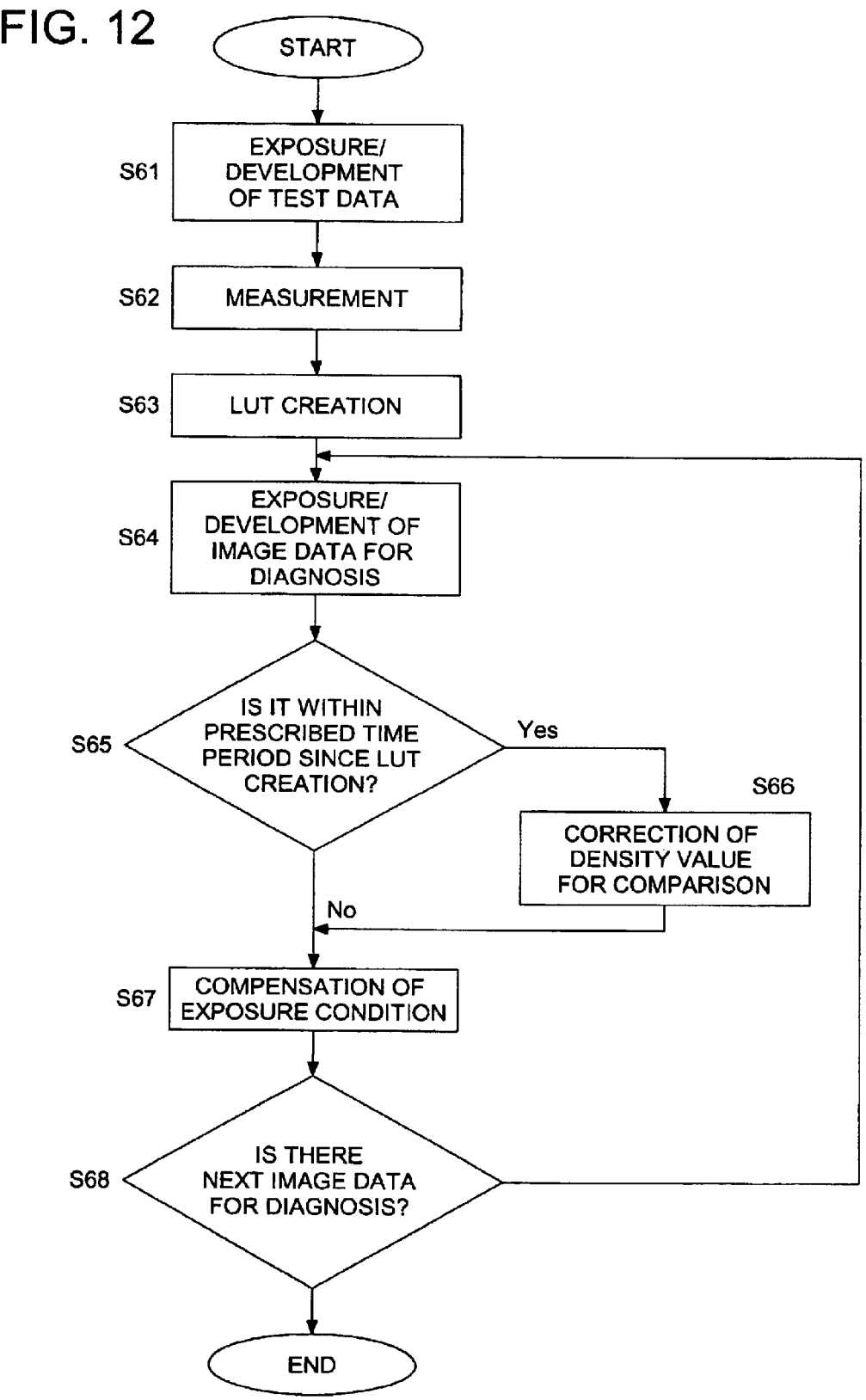
FIG. 12 is a flowchart representing the processing of the image processing apparatus given in FIG. 11.

FIG. 11 is a block diagram representing the functions of an image processing apparatus for implementing the image processing method of the present invention. FIG. 12 is a flowchart representing the processing of the image processing apparatus given in FIG. 11.

As shown in FIG. 11, the image processing apparatus of the present invention comprises an exposure section 120 for executing the exposure step, a development section 130 for executing the development step, a measurement means 200 for executing the measurement step, a calibration means 400 for executing the calibration step, a correction means 300 for executing the correction step, and a correction means for executing the correction step.

As shown in FIG. 12, test exposure data is exposed to light by the exposure section 120 and is developed by the development means 130 (S61).

The test exposure data contains image signals for a wide variety of values, and the image density conforming to the image signal are exposed and developed on the film in step S61.

The density of the film exposed by the exposure means 120 and developed by the development means 130 is measured by the measurement means 200 (S62). In this case, the measured density is exposed and developed on the film according to the image signal based on the test exposure data.

Figure 13:
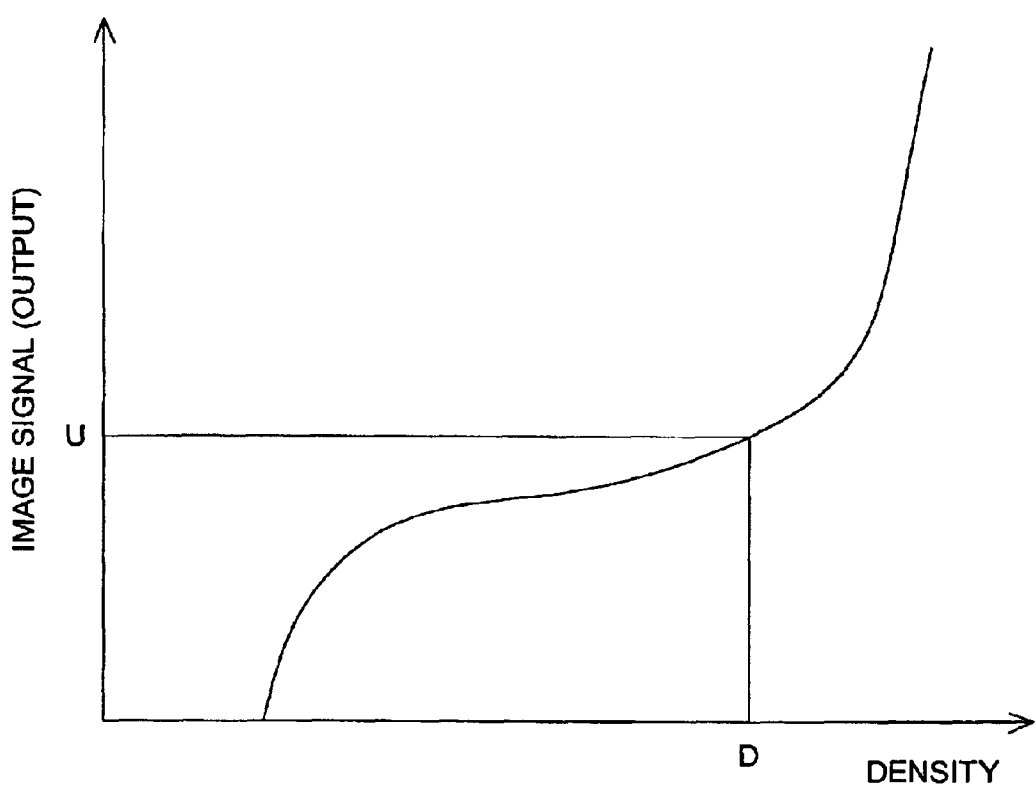
FIG. 13 shows an example of the LUT.

When the density is measured in step S62, a lookup table (LUT) is created in the calibration means 400 to associate the image signal to the density in such a way that the density specified by the diagnostic image data is reproduced on the film, based on the aforementioned test exposure data and density measured by the measurement means of the image exposed and developed on the film according to the test exposure data (S63). To put it more specifically, this is done by specifying from the test data the value of the image signal in forming on the film the density measured by the measurement means. The LUT, for example, can be represented as shown in FIG. 13.

Figure 14:
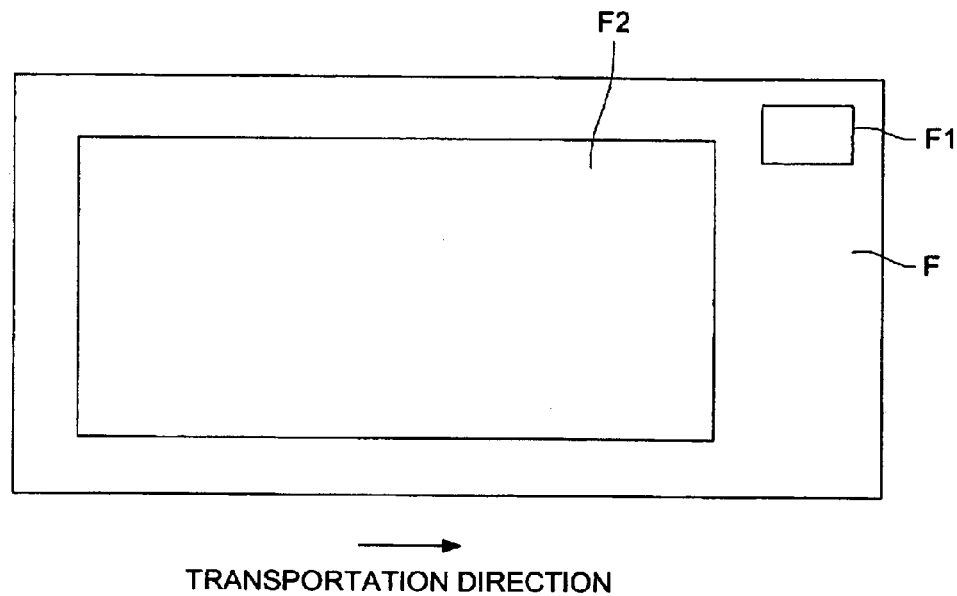
FIG. 14 is a diagram representing the image area and partial area of a film.
Figure 15:
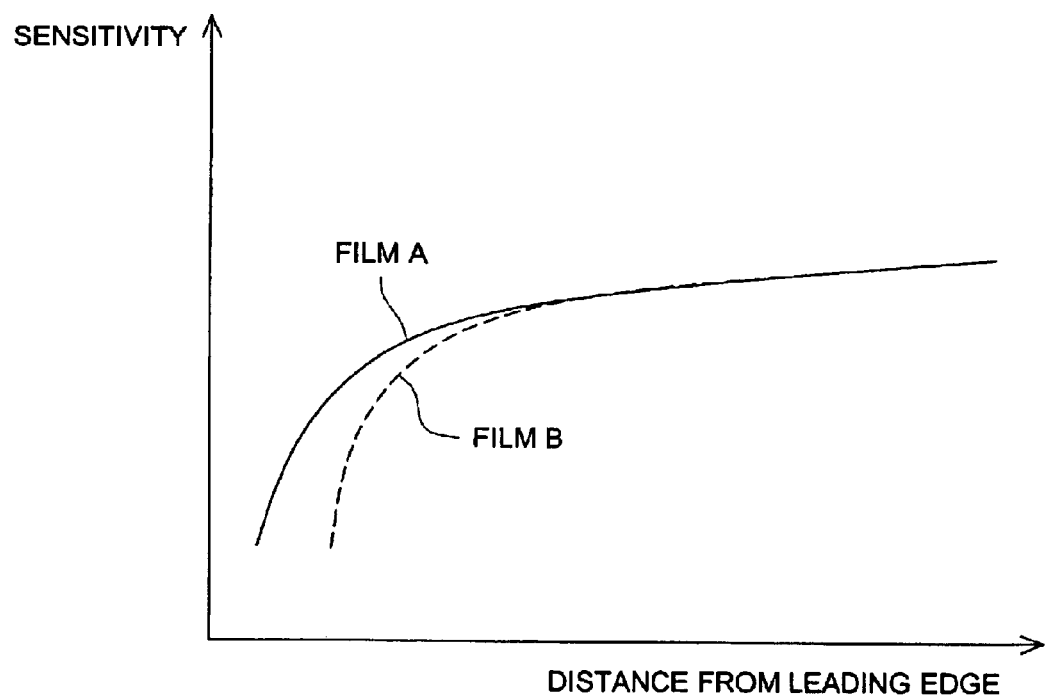
FIG. 15 is a diagram representing the differences in sensitivity according to film type.

When the LUT has been created in step S63, the image of the diagnostic image signal can be formed according to this LUT. Accordingly, the diagnostic image data is exposed by the exposure means 120 and developed by the development means 130 (S64). In formation of the image of the diagnostic image data in step S64, part of the film is exposed according to the same lookup table as that of the diagnostic image, concurrently as the diagnostic image is formed, in such a way that the predetermined density is reproduced. Part of the film where the image is formed refers to the area formed on the edge of the image formed area F2 such as F1 in the film F given in FIG. 14. For example, an area of about 5×10 mm is used for this purpose.

It is preferred that evaluation is made to determine whether or not the time elapsed is within the predetermined time period when counted from the time of creating he LUT in step S63. If more than the predetermined time has elapsed since the LUT was created, there may occur a deviation from the change of process in some cases.

If evaluation is made in step S65 to determine that the predetermined time has not elapsed, the density value for comparison is corrected according to the density value of the partial area exposed to reproduce the predetermined density, in the correction means 500 (S66). The density value for comparison refers to the predetermined density at the time of exposure to ensure that the predetermined density is produced in the partial area of the film in step S4. It is preferred that this density value for comparison be within the range from 1.0 to 2.0. For example, when the measured density value is 1.3 and the density value for comparison is 1.5, the density value for comparison subsequent to correction can be obtained, for example, from the following equation:

(Density value for comparison subsequent to correction)=Density value for comparison prior to correction)+(correction rate)× (measured density value−density value for comparison)

In this case, a proper correction rate can be selected with consideration given to the apparatus characteristics. If the correction rate in this case is 0.5, then the density value for comparison to be obtained is 1.5+0.5×(1.5−1.3) according to the aforementioned equation. The density value for comparison subsequent to correction is 1.4, and the difference from the predetermined density value is 0.1. Thus, the next exposure condition is corrected in such a way that the density is 0.1 higher (S67).

If evaluation is made in step S65 to determine that more than the predetermined time has elapsed or after the processing in step S66 has been completed, the exposure conditions in the exposure means 120 is compensated by the compensation means 300 so that the density of the next film will be optimized, based on the difference between the measured density value obtained by measuring the density in the partial area and the density value for comparison corresponding to the predetermined amount of exposure (S67). In the compensation made in step S67, if the measured density value is 1.8 and density value for comparison is 1.5 for example, compensation is made for the exposure conditions to optimize the density of next film, in such a way that the density value will be lower by 0.3, which is the difference between the two density values.

Subsequent to the processing by the compensation means 300 in step S67, evaluation is made to determine whether there is diagnostic image data or not (S68). If there is diagnostic image data, the system goes back to the processing of exposure and development in step S64.

Every time the processing in step S64 through 68 is performed, correction by correction means 500 is repeated until evaluation is made to determine that time elapsed is within the predetermined time period when counted from the time of creating the LUT in step S65. This allows correction to be made in the appropriately suppressed amount of correction, and prevents excessive compensation due to sudden changes from being made.

As described above, the present invention allows the patch density subsequent to creation of the LUT to be corrected automatically by the correction means 500. Thus, rise and fall of the density resulting from changes in characteristics between the patch portion and diagnostic image formed area that may occur when replacing the film type, or the rise and fall of the density resulting from the fluctuation of the image processing apparatus can be corrected by automatic change of the default value of the density value for comparison—without depending on service personnel—, thereby ensuring appropriate density of the finished film.

The following describes the functions as a third embodiment of the present invention in the image processing apparatus of FIG. 1, in terms of three embodiments. These functions are realized when controlled by the software program (program) stored in advance in the predetermined memory apparatus such as the flash ROM (not illustrated) in the image processing apparatus. The image processing apparatus of the present invention is provided with the microcomputer (computer) containing a CPU (not illustrated). The following functions are performed by running of the program by such a computer.

(Third Embodiment of the Present Invention—1)

Figure 16:
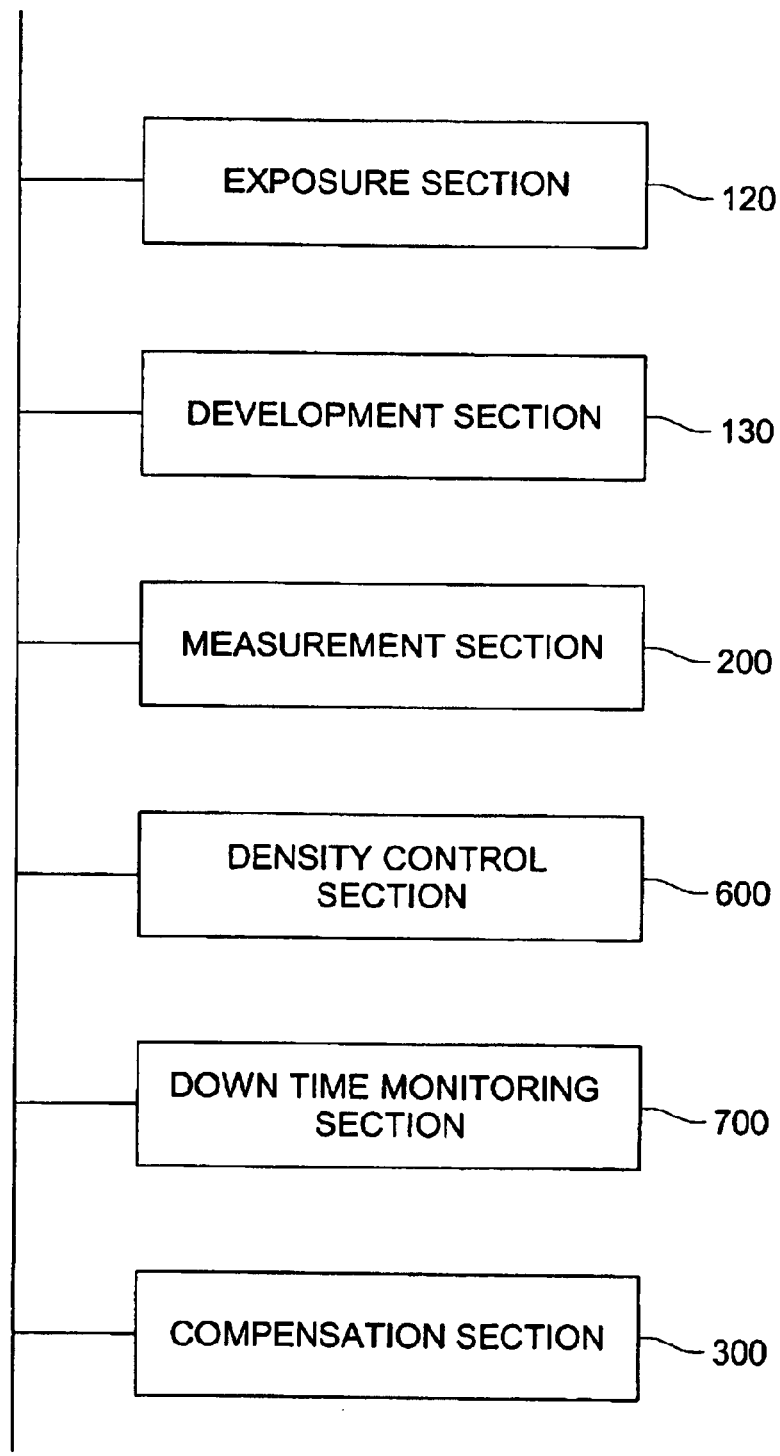
FIG. 16 is a block diagram representing the functions of the embodiment of the image processing apparatus for implementing the image processing method of the present invention.

FIG. 16 is a block diagram representing the function of the first embodiment of the image processing apparatus.

Figure 17:
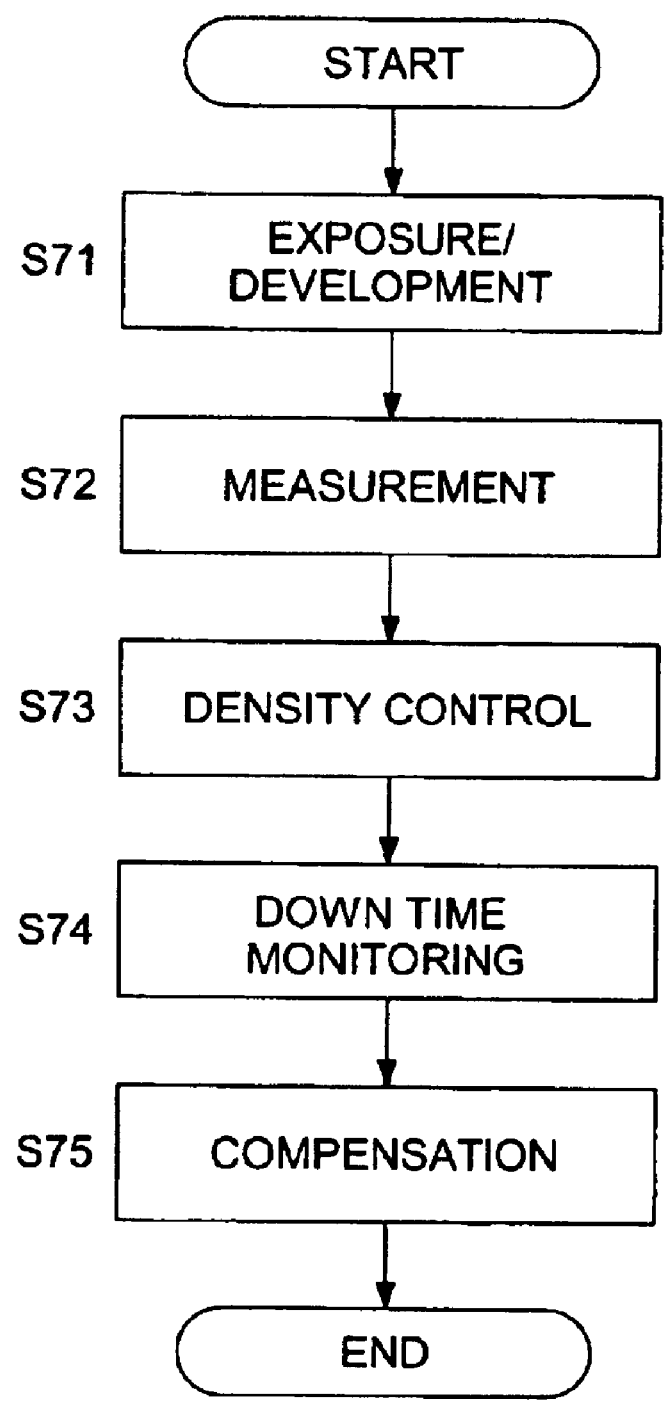
FIG. 17 is a flowchart representing the processing of the same.

FIG. 17 is a flowchart representing the processing by an image processing apparatus given in FIG. 16.

As shown in FIG. 16, the image processing apparatus comprises an exposure means 120 for executing the exposure step, a development means 130 for executing the development step, a densitometer 200 for executing the measurement step, a density control means 600 for executing the density control step, a down time monitoring means 700 for executing the time monitoring step and a compensation means 300 for executing the compensation step.

As shown in FIG. 17, exposure and development are performed in the exposure means 120 and development means 130 (S71). To put it more specifically, based on the image data, an image is formed as a latent image on the film. At the same time, part of the film is exposed using the output calculated through the lookup table (LUT) with respect to the predetermined amount of density, or specified exposure. Part of the film where the image is formed refers to the area formed on the edge of the image formed area F2 such as F1 in the film F given in FIG. 14. For example, an area of about 5×10 mm is used for this purpose. The used lookup table (LUT) is obtained by calibration. Calibration is defined as creation of a LUT to determine the relationship between image signal (specified density) and amount of exposure by obtaining the relationship between amount of exposure and density on the film through the step of measuring the density of a test image formed in advance. The LUT is represented in the form shown in FIG. 13.

The density of the partial area of the exposed and developed film is measured by the measurement means 200 (S72).

The density control means 600 controls the exposure section 120 and/or development section 130 so as to optimize the density of the next film to be printed, based on the difference between the predetermined density value for comparison and the measured density value, according to the result of measuring the density by the measurement section (hereinafter referred to as "patch data") (S73). The result of measuring the density refers to the density of the partial area of a film (measured density value) and the time of measuring that density. The predetermined density is defined as the value predetermined for calculating the amount of control to offset the factors affecting the density of the finished film such as the exposure means 120 and/or development means 130.

The density control means 600 uses two control methods, which will be described below.

(First Method)

In the density control means 600, the change in density resulting from the exposure means 120 and/or development means 130 is offset by subtracting the change of density based on the change in apparatus characteristics from the difference between the predetermined density value for comparison and the measured density value. The change in density based on the apparatus characteristics can be obtained as the difference of density in the characteristic change models corresponding to each of the density measuring time and reference time. Further, the density control means 600 adjusts the output of the exposure means 120 in the next image formation, based on the difference obtained after the difference in density based on the characteristics change model has been subtracted from the difference between the predetermined density value for comparison and the measured density value.

The image processing apparatus is subjected to changes in density resulting from the with-time temperature change of the exposure means 120 and/or development means 130.

Figure 18:
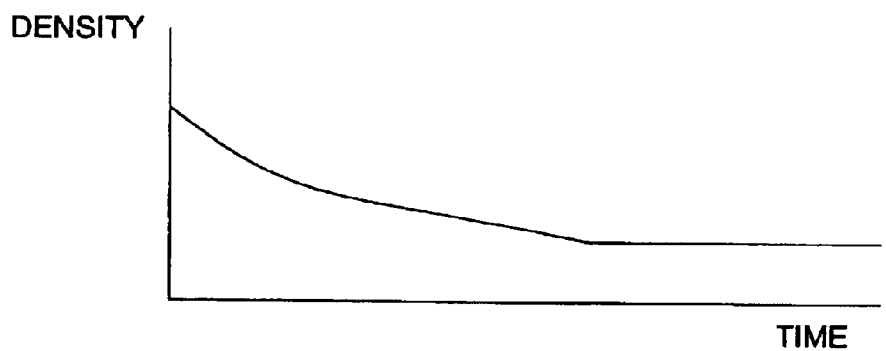
FIGS. 18(a) through (c) show an example of the characteristics fluctuation model inherent to the apparatus.
Figure 18:
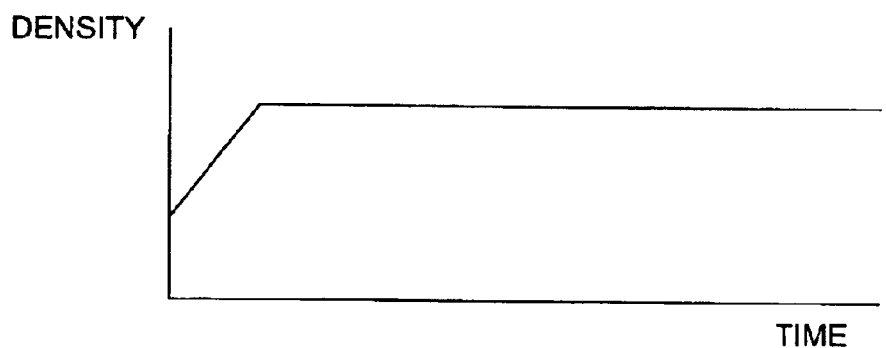
Figure 18:
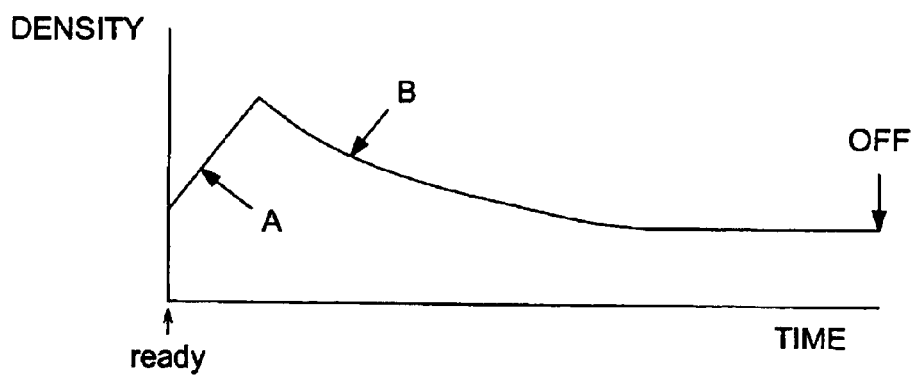

So such characteristic changes can be formulated into a model as characteristic change model. The characteristic change model is the model wherein change of characteristics with time is represented in terms of correlation between time and density, in the exposure section and/or development section of the apparatus. It is preferred that changes in characteristics inherent to the apparatus be used for such characteristic changes. This characteristic change model is exemplified in FIGS. 18(a) through (c). FIG. 18(a) shows an example of the characteristic change model of the exposure means 120. FIG. 18(b) indicates an example of the characteristic change model of the development means 130. FIG. 18(c) shows the characteristic change models of the exposure means 120 and development means 130. In FIG. 18(c), the portion of curve A indicates the characteristic change of a heat development apparatus as an example of the image processing apparatus; it shows the characteristics after processing is enabled (immediately after getting into READY state) 15 through 30 minutes after power is turned on from the state where the system has conformed to the installation environment. The portion of curve B is determined by the exposure and development characteristics due to the rise of temperature in the apparatus resulting from the next film processing.

Any one of the models given in FIGS. 18(a) through (c) can be used as the characteristic change model in the present invention. Use of the model of FIG. 18(c) is preferred from the viewpoint of conformance to the actual apparatus.

(Second Method)

The density control means 600 provides a so-called FF (Feed Forward) control method for applying reverse bias to the characteristic change based on the same characteristic change model as that of the first method.

As described above, after processing of the step S73 by the density control means 600, the down time monitoring means 700 monitors the down time (S74). When the down time is monitored by the down time monitoring means 700, the down time monitoring means 700 monitors the time when the power is turned off after completion of the processing of the step S73 by the density control means 600. For example, time is "0" if the power is not turned off.

The compensation means 300 compensates for the control of the density control means 600, based on the down time monitored by the down time monitoring means 700.

Figure 19:
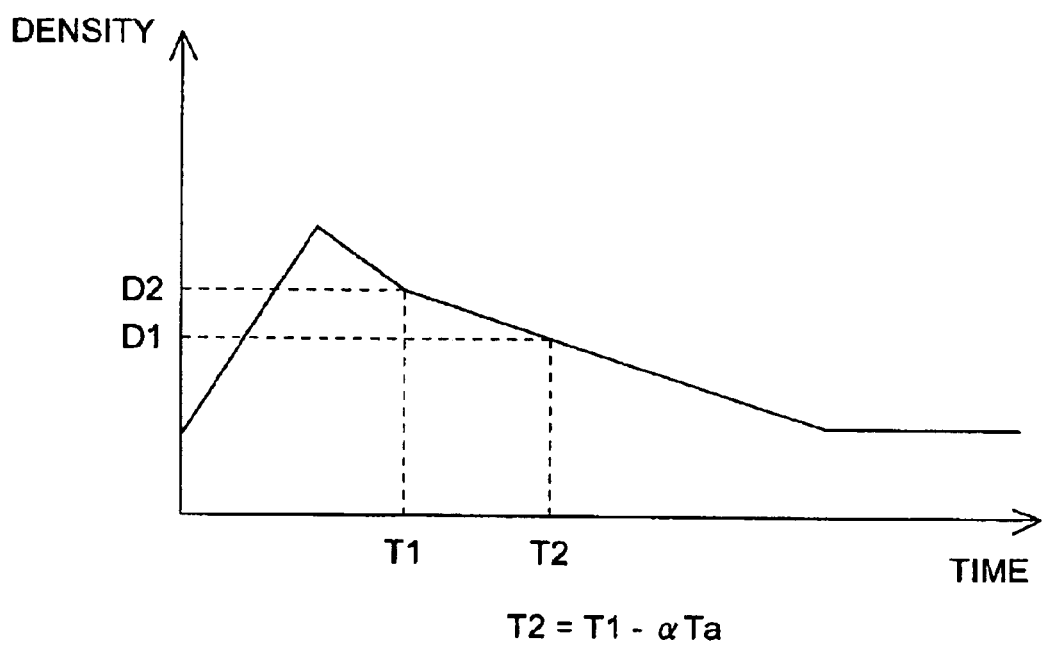
FIG. 19 is a diagram showing an example of compensation by a compensation section.

Compensation by the compensation means 300 will be described for the cases in the density control means 600 where control of the step S73 is made based on the characteristic change model given in FIG. 19 and where power is turned on when "Ta" has elapsed after power is turned off at T1. In the characteristic change model in FIG. 19, the output of the exposure means 120 in the formation of the next image is adjusted in such a way as to offset the difference (D2−D1) between the density value at time T2 obtained by returning "αTa"—a value proportional to "Ta" equivalent to the down time—from time T1 when the power is turned off, and the density value at T1. When the change of density is to be controlled based on the characteristic change of the apparatus by the second method in the density control means 600 after formation of the next image, calculation is made on the assumption that the apparatus is turned on from T2.

In the control of the present invention, even if power is turned off freely, the image of appropriate density can be outputted, without the need of unwanted consumption of films through calibration at every turning on of power, whereby energy is saved and a film is finished to have an appropriate density without wasting a film.

(Third Embodiment of the Present Invention—2)

Density control compensation is performed based on the temperature when power is turned on, in contrast to the compensation by the compensation means for correcting density control based on the time when power is turned on, according to the first embodiment.

Figure 20:
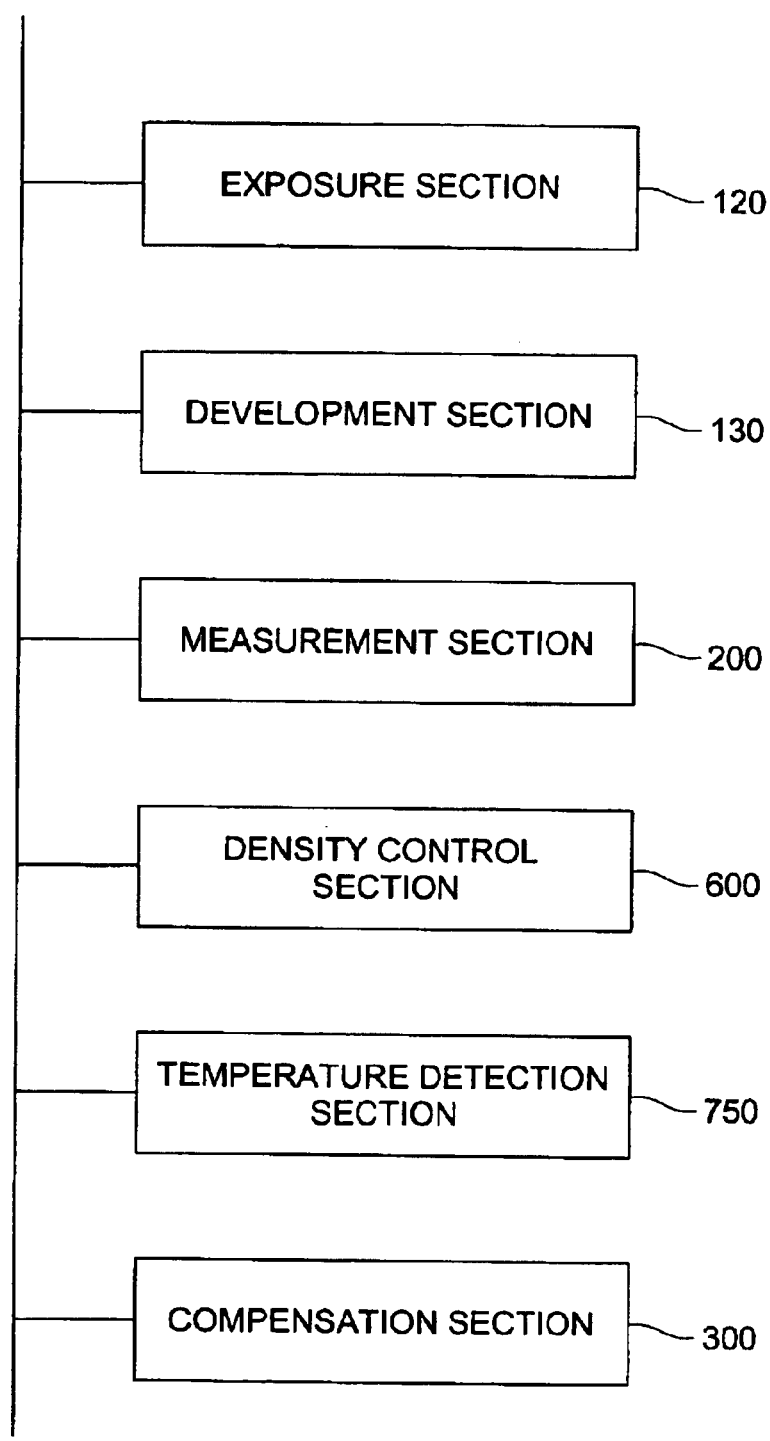
FIG. 20 is a block diagram representing the functions of the embodiment of the image processing apparatus for implementing the image processing method of the present invention.
Figure 21:
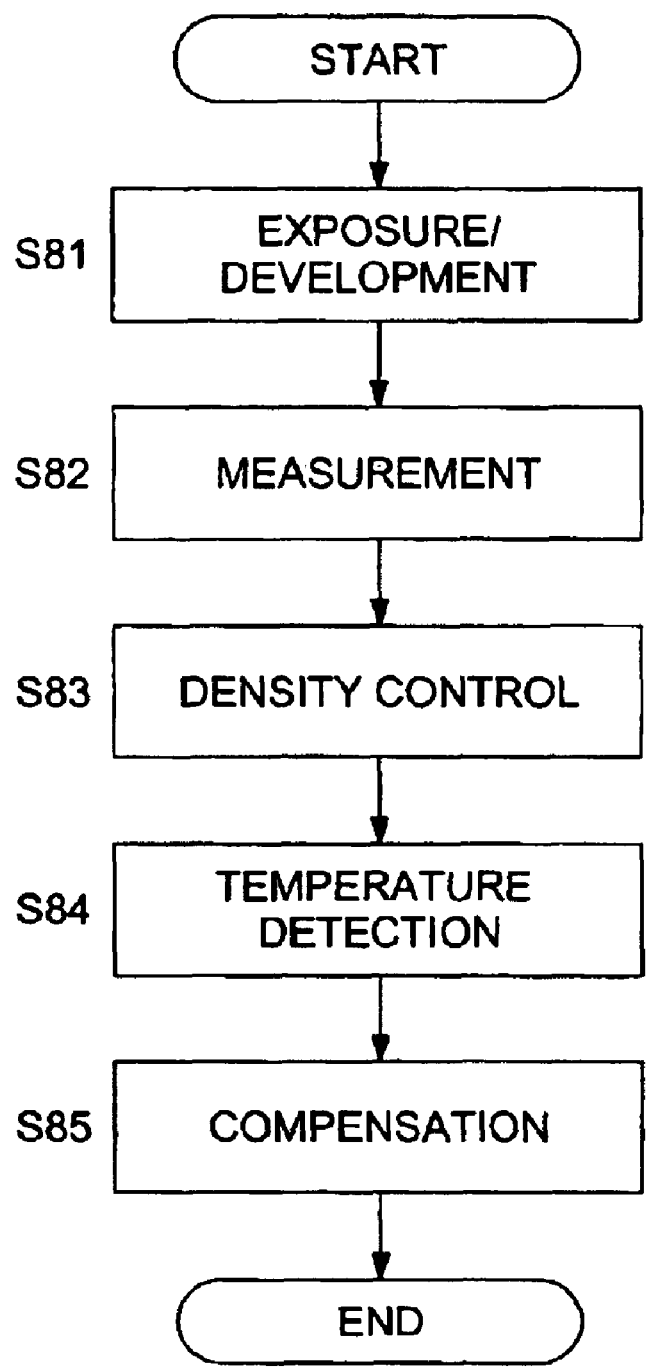
FIG. 21 is a flowchart representing the processing of the image processing apparatus given in FIG. 10.

FIG. 20 is a block diagram representing the functions of the third embodiment—2 of the image processing apparatus for implementing the image processing method of the present invention. Compensation for density control is performed based on the temperature when the power is turned on. FIG. 21 is a flowchart representing the processing of the image processing apparatus given in FIG. 20.

As shown in FIG. 20, the image processing apparatus of the present invention comprises an exposure means 120 for executing the exposure step, a development means 130 for executing the development step, a measuring means 200 for executing the measurement step, a density control means 600 for executing the density control step, a temperature detection means 750 for executing the temperature detection step, and a compensation means 300 for executing the compensation set.

As shown in FIG. 20, exposure and development are performed in the exposure means 120 and development means 130 (SB1). To put it more specifically, based on the image data, an image is formed as a latent image on the film. At the same time, part of the film is exposed using the output calculated through the lookup table (LUT) with respect to the predetermined amount of exposure or specified density. The LUT is represented in the form shown in FIG. 13, for example.

The density of the partial area of the exposed and developed film is measured by the measurement means 200 (S82).

The density control means 600 controls the exposure means 120 and/or development means 130 so as to optimize the density of the next film to be printed, based on the difference between the predetermined density value for comparison and the measured density value, according to the result of measuring the density by the measurement section (hereinafter referred to as "patch data") (S83). To put it more specifically, the density control means 600 provides the same control as that of the third embodiment—1.

Upon completion of processing in step S83 by the density control means 600, the temperature detection means 750 detects the temperature of at least one position on the image processing apparatus when power is turned on (S84). The temperature detection means 750 detects the temperature when power is turned off and is turned on upon completion of the processing in step S83 by the density control means 600. If power is turned off and power is not turned on, for example, the result of temperature detection is not measured.

For the temperature detection means 750, it is preferred that the cooling/transporting section is provided with the temperature detection means. In this case, the development means 130 is assumed to be provided with a heating/transporting section and cooling/transporting section. It is common practice that the temperature of the heating/transporting section is kept almost constant as development temperature when processing is enabled. The cooling/transporting section is affected by the heating drum before the state of permitting processing is reached. However, if a predetermined amount of film is processed before power is turned on, there is thermal effect from this heated film, so the cooling/transporting section is affected by the temperature based on the total thermal influence when power is turned on. To put it another way, this is because the variation in the finished density is affected by the temperature when the power of the cooling/transporting section is turned on.

It is preferred that the temperature detection means 750 detect the temperature of the exposure means 120. Changing characteristics of the exposure means 120 after the state of permitting processing is reached are different according to the temperature when the power is turned on. This is because there is fluctuation in the amount of light reaching the film, due to fluctuation in the AOM characteristics and LD wavelength and thermal expansion of the constituent parts of the optical system. To put it another way, the variation in the finished density resulting from the exposure means 120 is affected by the temperature when power is turned on.

The compensation means 300 compensates for the control by the density control means 600, based on the temperature detected by the temperature detection means 750 (S85).

Figure 22:
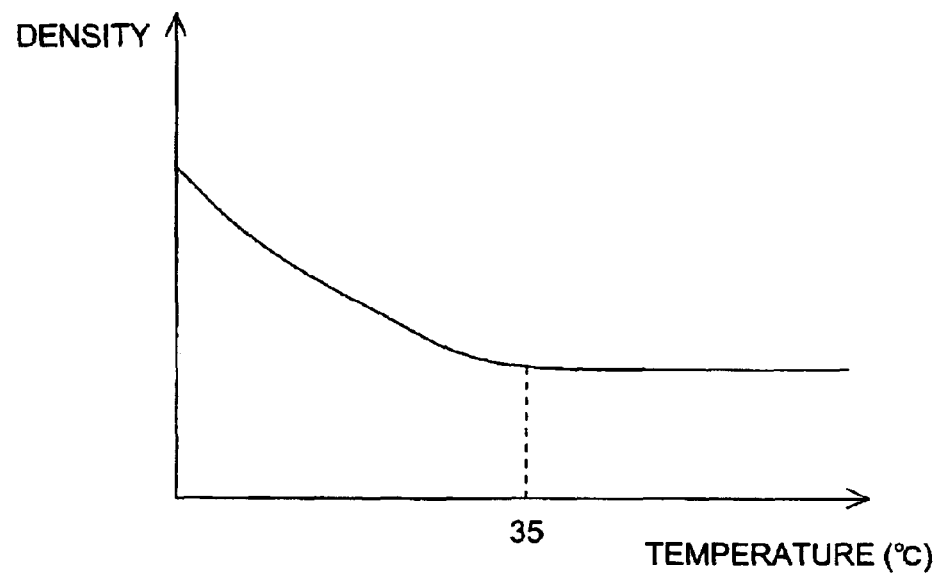
FIGS. 22(a) and (b) show an example of the fluctuation of characteristics caused by temperature.
Figure 22:
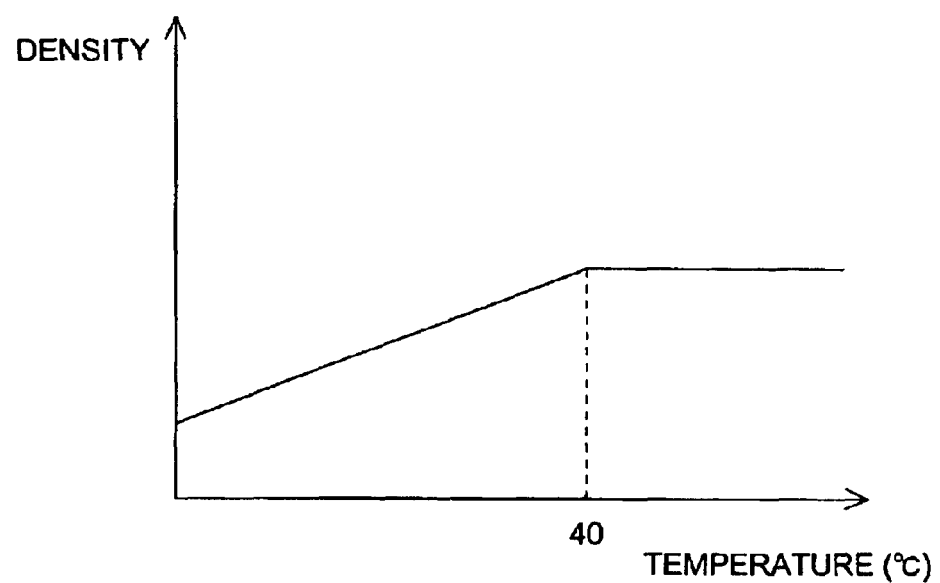

Compensation by the compensation means 300 can be obtained from the table showing correlation between the temperature when power is turned on as shown in FIGS. 22(*a*) and (*b*) and the amount of compensation for characteristic changes. FIG. 22(*a*) is a table representing the correlation of temperature characteristic changes resulting from the exposure means 120, and FIG. 22(*b*) is a table representing the correlation of temperature characteristic changes resulting from the development means 130. To put it more specifically, when the detected temperature when power is turned on is "Tb", the output of the exposure means 120 in the formation of the next image is adjusted in such a way as to offset the density corresponding to the temperature "Tb" obtained from the temperature characteristic change in FIG. 22.

In the control of the present invention, even if power is turned off freely, the image of appropriate density can be outputted, without the need of unwanted consumption of films through calibration at every turning on of power, whereby energy is saved and a film is finished to have an appropriate density without wasting a film.

(Third Embodiment of the Present Invention—3)

The present embodiment includes compensation for density control to be conducted based on the time when power is turned off in the third embodiment—1, and compensation for density control to be conducted based on the temperature when power is turned off in the third embodiment—2.

Figure 23:
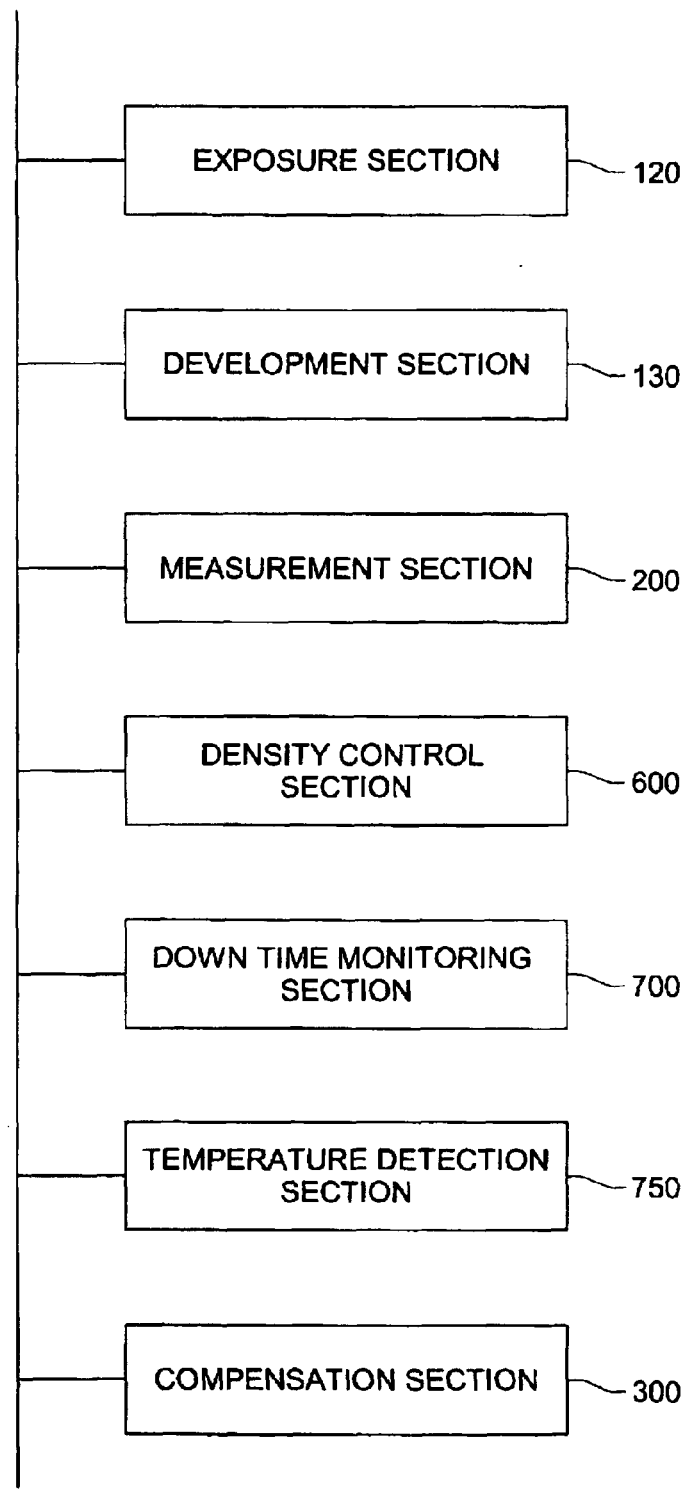
FIG. 23 is a block diagram representing the functions of the second embodiment of the image processing apparatus for implementing the image processing method of the present invention.
Figure 24:
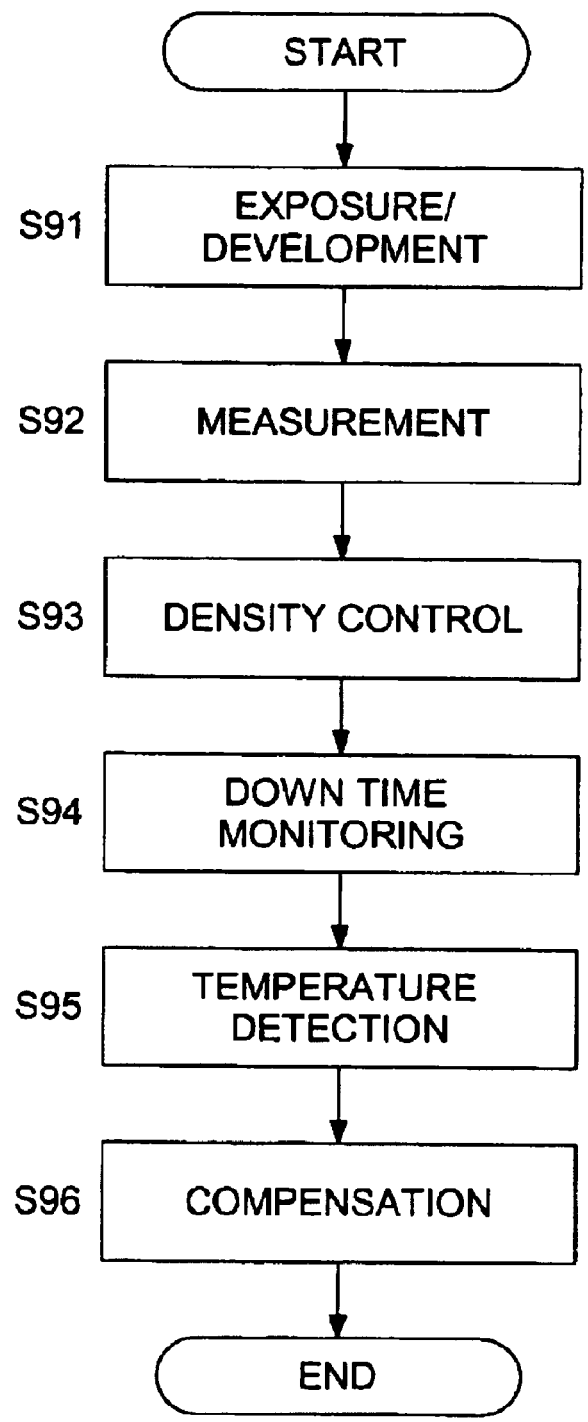
FIG. 24 is a flowchart representing the processing of the image processing apparatus given in FIG. 23.

FIG. 23 is a block diagram representing the functions of the third embodiment of the image processing apparatus for implementing the image processing method of the present invention. FIG. 24 is a flowchart representing the processing of the image processing apparatus given in FIG. 23.

As shown in FIG. 23, the image processing apparatus of the present invention comprises an exposure means 120 for executing the exposure step, a development means 130 for executing the development step, a measuring means 200 for executing the measurement step, a density control means 600 for executing the density control step, a down time monitoring means 700 for executing the down time monitoring process, a temperature detection means 750 for executing the temperature detection step, and a compensation means 300 for executing the compensation set.

As shown in FIG. 24, exposure and development are performed in the exposure means 120 and development means 130 (S91). To put it more specifically, based on the image data, an image is formed as a latent image on the film. At the same time, part of the film is exposed using the output calculated through the lookup table (LUT) with respect to the predetermined amount of exposure or specified density. The LUT is represented in the form shown in FIG. 13, for example.

The density of the partial area of the exposed and developed film is measured by the measurement means 200 (S92).

The density control means 500 controls the exposure means 120 and/or development means 130 so as to optimize the density of the next film to be printed, based on the difference between the predetermined density value for comparison and the measured density value, according to the result of measuring the density by the measurement means (hereinafter referred to as "patch data") (S93). To put it more specifically, the density control means 500 provides the same control as that of the third embodiment—1.

Upon completion of processing in step S93 by the density control means 600, the down time monitoring means 700 monitors the down time for the image processing apparatus (S94). When the down time monitoring means 700 monitors the down time, it monitors the time when power is turned off upon completion of the step S93 by the density control means 600. For example, time is "0" if the power is not turned off.

The temperature detection means 750 detects the temperature of at least one position on the image processing apparatus when power is turned on (S95). The temperature detection means 750 detects the temperature when power is turned off and is turned on upon completion of the processing in step S93 by the density control means 600. If power is turned off and power is not turned on, for example, the result of temperature detection is not measured.

For the temperature detection means 750, it is preferred that the cooling/transporting section is provided with the temperature detection means. In this case, the development means 130 is assumed to be provided with a heating/transporting section and cooling/transporting section. It is common practice that the temperature of the heating/transporting section is kept almost constant as development temperature when processing is enabled. The cooling/transporting section is affected by the heating drum before the state of permitting processing is reached. However, if a predetermined amount of film is processed before power is turned on, there is thermal effect from this heated film, so the cooling/transporting section is affected by the temperature based on the total thermal influence when power is turned on. To put it another way, this is because the variation in the finished density is affected by the temperature when the power of the cooling/transporting section is turned on.

It is preferred that the temperature detection means 750 detect the temperature of the exposure means 120. Changing characteristics of the exposure means 120 after the state of permitting processing is reached are different according to the temperature when the power is turned on. This is because there is fluctuation in the amount of light reaching the film, due to fluctuation in the AOM characteristics and LD wavelength and thermal expansion of the constituent parts of the optical system. To put it another way, the variation in the finished density resulting from the exposure means 120 is affected by the temperature when power is turned on.

The compensation means 300 compensates for the control by the density control means 600, based on down time monitored by the down time monitoring means 700 and the temperature detected by the temperature detection means 750 (S96).

In compensation by the compensation means 300, the output of the exposure means 120 in the formation of the next image is adjusted in such a way as to offset:

the difference in density (D2–D1) corresponding to the time "αTa" proportional to the down time obtained by the same method as that of the third embodiment—1, based on the down time monitored by the down time monitoring means 700, and the density obtained by the same method as that of the third embodiment—2, based on the temperature detected by the temperature detection means 750.

In the control of the present invention, even if power is turned off freely, the image of appropriate density can be outputted, without the need of unwanted consumption of films through calibration at every turning on of power, whereby energy is saved and a film is finished to have an appropriate density without wasting a film.

EFFECTS OF THE INVENTION

The density adjustment method of the present invention maintains the image density of the same diagnostic image signals within the scope of almost the same density, even if fluctuation has occurred to the characteristics of the exposure and development systems or a difference has occurred to the film characteristics in formation of a diagnostic image.

The present invention provides an image processing apparatus, an image processing method and a program wherein, even if there is any fluctuation in an image processing apparatus or films of different types (film characteristics) are used, the density value for comparison is automatically corrected using the measured density value of the patch portion immediately after calibration, whereby the default value is automatically corrected and the finished film is adjusted to have an appropriate density.

The present invention further provides an image processing apparatus, an image processing method and a program wherein, even if power is turned off freely, the image of appropriate density can be outputted, without the need of unwanted consumption of films through calibration at every turning on of power, whereby energy is saved and a film is finished to have an appropriate density without wasting a film.

What is claimed is:

1. A density adjustment method for adjusting a density of a diagnostic image formed on a film, comprising:

exposing an image to form an latent image on the film based on test exposure data and/or diagnostic image data;

developing the latent image to form a developed image;

measuring a density of the developed image;

creating a lookup table for relating the diagnostic image data and amount of exposure so as to reproduce a density specified by the diagnostic image data, based on the test exposure data and a measured density of the developed image formed on the film by the test exposure data; and compensating by correcting at least one of an exposure condition in the exposing step and a development condition in the developing step to ensure that the next film has the optimized density, based on the difference between the measured density value obtained by exposing a partial area of the film with a prescribed exposure amount at the time of forming the diagnostic image with the diagnostic image data and by measuring the density of the partial area of the film, and a density value for comparison corresponding to the prescribed exposure amount;

wherein, a density of a prescribed area, exposed by a specific exposure amount, in an image formed by an exposure based on the test exposure data, is measured, and the measured value of the density is used as the density value for comparison; at the same time, the specific exposure amount is used as the prescribed exposure amount for exposing the partial area of the film at the time of forming a diagnostic image.

2. The density adjustment method of claim 1, wherein the density of a prescribed area is within the range of 1.0 through 2.0.

3. The density adjustment method of claim 1, wherein a prescribed area, positioned at the tip of the film, in the image formed by an exposure based on the test exposure data is used for measuring the density of a prescribed area.

4. The density adjustment method of claim 1, wherein the partial area of the film is positioned at the tip of the film, at the time of forming the diagnostic image.

5. A density adjustment method for adjusting a density of a diagnostic image formed on a film, comprising:

exposing an image to form an latent image on the film based on test exposure data and/or diagnostic image data;

developing the latent image to form a developed image;

measuring a density of the developed image;

creating a lookup table for relating the diagnostic image data and amount of exposure so as to form a density specified by the diagnostic image data, based on the test exposure data and a measured density of the developed image formed on the film by the test exposure data; and compensating by correcting at least one of an exposure condition in the exposing step and a development condition in the developing step to ensure that the next film has the optimized density, based on the difference between the measured density value obtained by exposing a partial area of the film with a prescribed exposure amount at the time of forming the diagnostic image with the diagnostic image data and by measuring the density of the partial area of the film, and a density value for comparison corresponding to the prescribed exposure amount;

wherein, after creation of the lookup table, a specific exposure amount is obtained from the lookup table to get a predetermined density, the film is exposed by the specific exposure amount to form an image, a density of the image is measured, and the density of the image is used as the density for comparison, while the partial area of the film is exposed by the specific exposure amount at the time of forming a subsequent diagnostic image.

6. The density adjustment method of claim 5, the predetermined density is within the range of 1.0 through 2.0.

7. The density adjustment method of claim 5, wherein the density of the image used as the density for comparison is a density of a predetermined area of an image positioned at the tip of the film.

8. The density adjustment method of claim 7, wherein the density of a predetermined area is an average of values having been measured several times.

9. The density adjustment method of claim 5, wherein when a condition change has been made to at least one of the film, the developing step, the exposing step and the density measuring step, the lookup table is created, and the density value for comparison is set.

10. The density adjustment method of claim 9, the predetermined density is within the range of 1.0 through 2.0.

11. The density adjustment method of claim 9, wherein the density of the image used as the density for comparison is a density of a predetermined area of an image positioned at the tip of the film.

12. The density adjustment method of claim 11, wherein the density of a predetermined area is an average of values having been measured several times.

13. The density adjustment method of claim 9, wherein the developing step is carried out by a heating section containing the heating member to heat the film, and by a cooling/transporting section for transporting the heated film while cooling it, wherein when the heating member has been replaced and/or the cooling/transporting section has been subjected to maintenance, the lookup table is created and the density value for comparison is set.

14. The density adjustment method of claim 1, wherein when a condition change has been made to at least one of the film, the developing step, the exposing step and the density measuring step, the lookup table is created, and the density value for comparison is set.

15. The density adjustment method of claim 14, the density of a prescribed area is within the range of 1.0 through 2.0.

16. The density adjustment method of claim 14, wherein a prescribed area, positioned at the tip of the film, in the image formed by an exposure based on the test exposure data is used for measuring the density of a prescribed area.

17. The density adjustment method of claim 14, wherein the partial area of the film is positioned at the tip of the film, at the time of forming the diagnostic image.

18. The density adjustment method of claim 14, wherein the developing step is carried out by a heating section containing the heating member to heat the film, and by a cooling/transporting section for transporting the heated film while cooling it, wherein when the heating member has been replaced and/or the cooling/transporting section has been subjected to maintenance, the lookup table is created and the density value for comparison is set.

19. An image processing apparatus for processing a diagnostic image, comprising:

an exposure section for exposing an image to form an latent image on the film based on test exposure data and diagnostic image data;

a development section for developing the latent image to form a developed image;

a measurement section for measuring a density of the developed image;

a calibration section for creating a lookup table for relating the diagnostic image data and amount of exposure so as to reproduce a density specified by the diagnostic image data, based on the test exposure data and a measured density of the developed image formed on the film by the test exposure data; and a compensation section for correcting at least one of an exposure condition in the exposure section and a development condition in the development section to ensure that a next film has an optimized density, based on the difference between the measured density value obtained by exposing a partial area of the film with a prescribed exposure amount, which is obtained from the lookup table so as to reproduce a predetermined density, at the time of forming the diagnostic image with the diagnostic image data, and by measuring the density of the partial area of the film, and a density value for comparison corresponding to the prescribed exposure amount;

wherein the image processing apparatus further comprises a correction section for correcting the density value for comparison based on the measured density value, prior to correction by the compensation section subsequent to creation of the lookup table by the calibration section.

20. The image processing apparatus of claim 19, wherein the correction section corrects the density value for comparison based on the measured density value, at the time of forming an image within the predetermined time subsequent to creation of a lookup table by the calibration section.

21. The image processing apparatus of claim 19, wherein the density value for comparison is within the range of 1.0 through 2.0.

22. An image processing method for processing a diagnostic image, comprising:

exposing an image to form an latent image on the film based on test exposure data and diagnostic image data;

developing the latent image to form a developed image;

measuring a density of the developed image;

calibrating by creation of a lookup table for relating the diagnostic image data and amount of exposure so as to form a density specified by the diagnostic image data, based on the test exposure data and a measured density of the developed image formed on the film by the test exposure data; and compensating by correcting at least one of an exposure condition in the exposing step and a development condition in the developing step to ensure that a next film has an optimized density, based on the difference between the measured density value obtained by exposing a partial area of the film with a prescribed exposure amount, which is obtained from the lookup table so as to reproduce a predetermined density, at the time of forming the diagnostic image with the diagnostic image data, and by measuring the density of the partial area of the film, and a density value for comparison corresponding to the prescribed exposure amount;

wherein the image processing method further comprises a correcting step for correcting the density value for comparison based on the measured density value, prior to correction by the compensating step subsequent to creation of the lookup table by the calibrating step.

23. The image processing method of claim 22, wherein the correcting step corrects the density value for comparison based on the measured density value, at the time of forming an image within the predetermined time subsequent to creation of a lookup table by the calibrating step.

24. The image processing method of claim 22, wherein the density value for comparison is within the range of 1.0 through 2.0.

25. A program for making a computer conduct an image processing method by being incorporated in an image processing apparatus, the image processing method comprising:

exposing an image to form an latent image on the film based on test exposure data and diagnostic image data;

developing the latent image to form a developed image;

measuring a density of the developed image;

calibrating by creation of a lookup table for relating the diagnostic image data and amount of exposure so as to reproduce a density specified by the diagnostic image data, based on the test exposure data and a measured density of the developed image formed on the film by the test exposure data; and compensating by correcting at least one of an exposure condition in the exposing step and a development condition in the developing step to ensure that a next film has an optimized density, based on the difference between the measured density value obtained by exposing a partial area of the film with a first prescribed exposure amount, which is obtained from the lookup table so as to reproduce a predetermined density, at the time of forming the diagnostic image with the diagnostic image data, and by measuring the density of the partial area of the film, and a density value for comparison corresponding to the prescribed exposure amount;

wherein the image processing method further comprises a correcting step for correcting the density value for comparison based on the measured density value, prior to correction by the compensating step subsequent to creation of the lookup table by the calibrating step.

* * * * *